(12) United States Patent
Jang

(10) Patent No.: US 10,788,107 B2
(45) Date of Patent: Sep. 29, 2020

(54) DISPLAY DEVICE

(71) Applicant: Sungjune Jang, Seoul (KR)

(72) Inventor: Sungjune Jang, Seoul (KR)

( * ) Notice: Subject to any disclaimer, the term of this patent is extended or adjusted under 35 U.S.C. 154(b) by 303 days.

(21) Appl. No.: 15/492,861

(22) Filed: Apr. 20, 2017

(65) Prior Publication Data
US 2017/0309207 A1   Oct. 26, 2017

(30) Foreign Application Priority Data

Apr. 20, 2016 (KR) .................. 10-2016-0048092
Apr. 3, 2017 (KR) .................. 10-2017-0043106

(51) Int. Cl.
*F16H 19/06* (2006.01)
*G09F 19/02* (2006.01)

(52) U.S. Cl.
CPC .............. *F16H 19/06* (2013.01); *G09F 19/02* (2013.01)

(58) Field of Classification Search
None
See application file for complete search history.

(56) References Cited

U.S. PATENT DOCUMENTS

| | | | | |
|---|---|---|---|---|
| 4,030,832 A * | 6/1977 | Rando | ............ | G01B 11/272 33/293 |
| 4,651,589 A * | 3/1987 | Lambert | ............ | B25J 9/1095 180/7.1 |
| 5,787,671 A * | 8/1998 | Meguro | ............ | B64G 1/222 52/646 |
| 6,099,217 A * | 8/2000 | Wiegand | ............ | B23Q 1/5462 408/234 |
| 6,290,377 B1 * | 9/2001 | Hulse | ............ | B60Q 1/2657 362/385 |
| 6,636,781 B1 * | 10/2003 | Shen | ............ | B08B 9/045 318/568.11 |
| 6,869,246 B2 * | 3/2005 | Bridgers | ............ | F16B 7/048 135/122 |
| 7,444,205 B2 * | 10/2008 | Desmond | ............ | B82Y 10/00 700/245 |
| 7,464,503 B2 * | 12/2008 | Hoberman | ............ | A63H 31/00 52/645 |
| 2013/0340373 A1 * | 12/2013 | Santiago Prowald | . | B64G 1/222 52/646 |

* cited by examiner

*Primary Examiner* — Kristina N Junge
(74) *Attorney, Agent, or Firm* — Ked & Associates, LLP

(57) ABSTRACT

A shape display device is disclosed. The shape display device includes a plurality of couplers; and a plurality of rods pivotally connected to the coupler, the rod having a varying length in a lengthwise direction, the rod including: a main frame; a circuit board accommodated in the main frame; a first slider movably mounted on the main frame, the first slider connected to a first coupler among the plurality of couplers; a second slider movably mounted on the main frame, the second slider connected to a second coupler among the plurality of couplers; and a driver installed in the main frame, the driver providing the first and second sliders with a driving force, the driver connected to the circuit board electrically.

17 Claims, 28 Drawing Sheets

FIG. 3
(a)
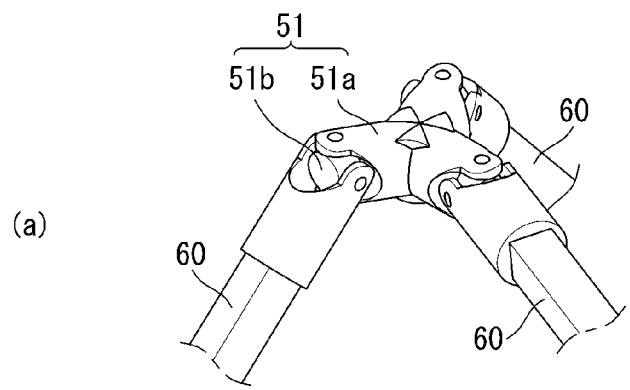
(b)
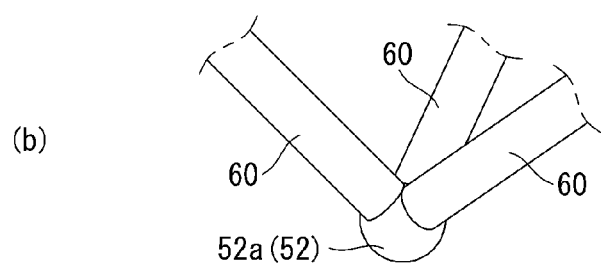
(c)
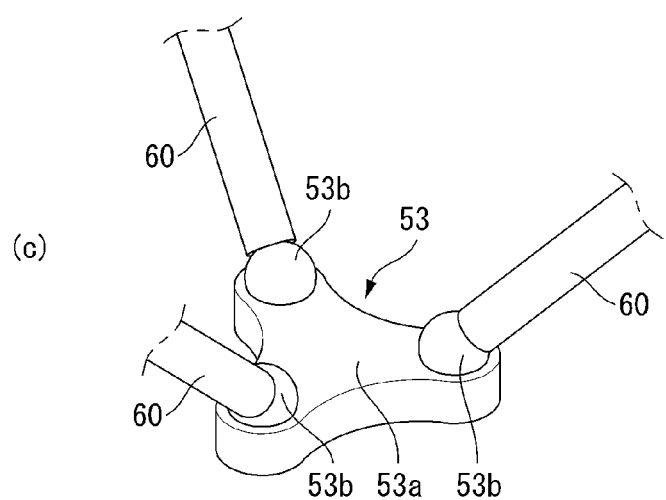

DISPLAY DEVICE

This application claims the benefit of Korean Patent Application No. 10-2017-0043106 filed on Apr. 3, 2017, and Korean Patent Application No. 10-2016-0048092 filed on Apr. 20, 2016, the entire contents of which are incorporated herein by reference for all purposes as if fully set forth herein.

BACKGROUND OF THE INVENTION

Field of the Invention

The present invention relates to a shape display device. Especially the present invention relates to a shape display device including a plurality of rods and a plurality of couplers linking the plurality of rods to simulate a three-dimensional shape.

Discussion of the Related Art

Three-dimensional shape simulation may be required in various industries. For example, three-dimensional shape simulation can be realized in terms of visual effects. For example, a three-dimensional hologram can visually simulate a three-dimensional shape. However, a three-dimensional hologram may have many difficulties in providing a sense of touch.

A three-dimensional printer can create a three-dimensional model by simulating a three-dimensional shape. The three-dimensional model simulating the three-dimensional shape can provide a sense of touch. However, it may be difficult for the three-dimensional model produced by a three-dimensional printer to respond to any movement of the three-dimensional shape.

SUMMARY OF THE INVENTION

Accordingly, an object of the present disclosure is to address the above-described and other problems.

Another object of the present disclosure is to provide a shape display device simulating a three-dimensional shape.

Another object of the present disclosure is to provide a shape display device including a plurality of rods having variable lengths.

Another object of the present disclosure is to provide a shape display device changing its shape in cooperation with an external device.

According to one aspect, there is provided a shape display device, comprising: a plurality of couplers; and a plurality of rods pivotally connected to the coupler, the rod having a varying length in a lengthwise direction, the rod including: a main frame; a circuit board accommodated in the main frame; a first slider movably mounted on the main frame, the first slider connected to a first coupler among the plurality of couplers; a second slider movably mounted on the main frame, the second slider connected to a second coupler among the plurality of couplers; and a driver installed in the main frame, the driver providing the first and second sliders with a driving force, the driver connected to the circuit board electrically.

According to another aspect of the present disclosure, the first slider may be positioned opposite to the second slider with respect to the main frame.

According to another aspect of the present disclosure, the rod may include a case, wherein the case comprises the first slider, the second slider, and the main frame, and the first and second sliders may be capable of being drawn out of the case or being put into the case.

According to another aspect of the present disclosure, the rod may include a sensor pad positioned between the first and second sliders and the case, the sensor pad may sense a touch or an approach of external object.

According to another aspect of the present disclosure, the sensor pad may include: a first pad facing the first slider; and a second pad facing the second slider.

According to another aspect of the present disclosure, the main frame may include: a first beam extended in the lengthwise direction; a second beam extended in the lengthwise direction, the second beam facing the first beam, the second beam spaced apart from the first beam; and a cradle extended from the second beam, the cradle forming an accommodation space therein.

According to another aspect of the present disclosure, the main frame may further comprise: a first end portion located at an end of the main frame, the first end portion connecting the first beam and the second beam; and a second end portion located at another end of the main frame, the second end portion connecting the first beam and the second beam.

According to another aspect of the present disclosure, the cradle may be positioned between the first end portion and the second end portion, and the cradle may be spaced apart from the first beam.

According to another aspect of the present disclosure, the cradle may include: a first cradle facing the first slider, the first cradle spaced apart from the first beam; and a second cradle facing the second slider, the second cradle spaced apart from the second beam.

According to another aspect of the present disclosure, the rod may include a power transmission portion installed in the main frame, the driver may include a rotation motor installed in the main frame, the rotation motor adjacent to the first end portion, and the power transmission portion may include: a first connection gear rotatably installed in the main frame, the first connection gear being provided with a rotational force from the rotation motor; a second connection gear rotatably installed in the main frame, the second connection gear adjacent to the second end portion; and a belt having a ring shape, the belt connecting the first connection gear and the second connection gear.

According to another aspect of the present disclosure, a portion of the belt may be located between the cradle and the first beam.

According to another aspect of the present disclosure, the rod may include a power connection portion connected to the slider, the power connection portion may be located between the first beam and the cradle, and the power connection portion may be coupled with the belt mechanically.

According to another aspect of the present disclosure, the power connection portion may include: a base formed adjacent to an edge of the slider; a first wall extended toward another edge of the slider from the base; and a second wall extended toward the other edge of the slider from the base, the second wall spaced apart from the first wall, the belt may be fitted into between the first wall and the second wall.

According to another aspect of the present disclosure, the belt may include: a belt body having a ring shape; and a plurality of belt protrusions projecting from the belt body; the power connection portion may include: a protrusion projecting toward the first wall from the second wall, the protrusion engaging with the belt protrusion.

According to another aspect of the present disclosure, the power transmission portion may include: a first bevel gear connected to the rotation motor; and a second bevel gear connected to the first connection gear coaxially, the second bevel gear engaging with the first bevel gear.

According to another aspect of the present disclosure, the rod includes a case accommodating the first and second sliders and the main frame, wherein the first slider is accommodated in a space formed by the case, the second beam, the first cradle, and the first beam, and wherein the second slider is accommodated in a space formed by the case, the second beam, the second cradle, and the first beam.

According to another aspect of the present disclosure, the first slider may include: a first slider body facing the first cradle; and a first slider cap extended from the first slider body, the first slider cap adjacent to the first end portion, and the second slider may include: a second slider body facing the second cradle; and a second slider cap extended from the second slider body, the second slider cap adjacent to the second end portion.

According to another aspect of the present disclosure, the main frame may be located between the first slider cap and the second slider cap, and wherein the first and second slider caps include a node link portion coupled with the coupler.

According to another aspect of the present disclosure, the coupler may include a metal, and the node link portion may include a magnet coupled with the coupler magnetically.

According to another aspect of the present disclosure, the rod may include: a display installed in the main frame, the display radiating a light or forming an image; a camera installed in the main frame; and a case accommodating the main frame and the first and second sliders, and the case may include a window through which light pass.

According to another aspect of the present disclosure, the window may include at least one of a transparent portion of the case or an opening of the case.

According to another aspect of the present disclosure, the circuit board may include a communication module which communicates with an external terminal wirelessly.

According to another aspect of the present disclosure, the rod includes a battery accommodated in the main frame, and the battery may be connected to the circuit board electrically.

According to another aspect of the present disclosure, the first slider may move symmetrically with the second slider with respect to the main frame.

An effect of the display device according to the present disclosure is described below.

According to at least one aspect of the present disclosure, the shape display device may simulate a three-dimensional shape.

According to at least one aspect of the present disclosure, the shape display device may include a plurality of rods having variable lengths, and the lengths of the rods may be controllable.

According to at least one aspect of the present disclosure, the shape display device may change its shape in cooperation with an external device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3 is a view illustrating couplers according to various embodiments of present invention.

DETAILED DESCRIPTION OF THE EMBODIMENTS

Figure 1:
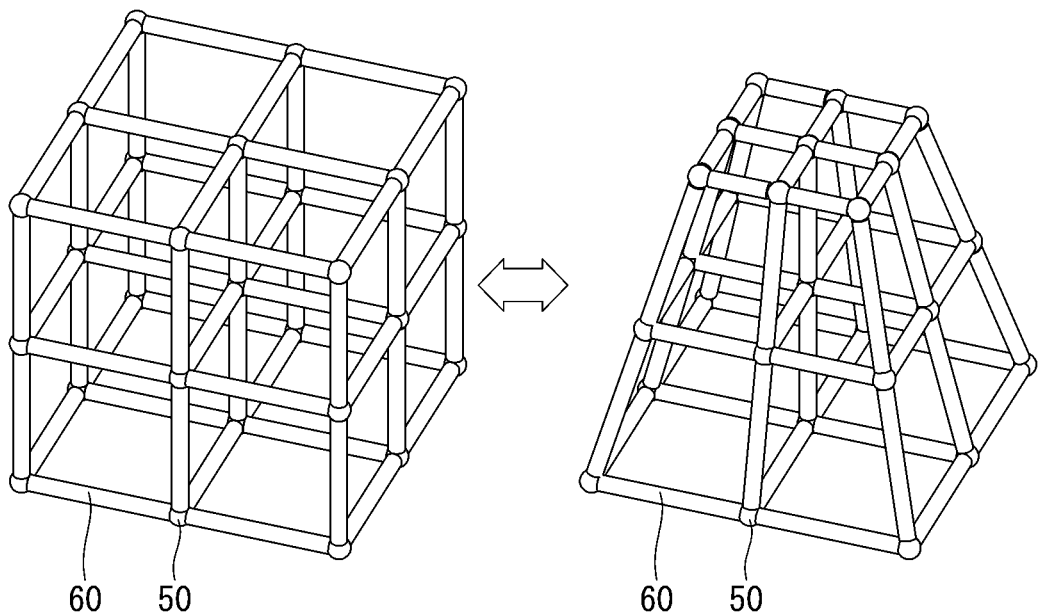
FIGS. 1 and 2 are views illustrating a shape display device according to various embodiments of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, the present invention is not limited to specific disclosed embodiments, but includes all modifications, equivalents and substitutes included within the spirit and technical scope of the present invention.

The terms 'first', 'second', etc. may be used to describe various components, but the components are not limited by such terms. The terms are used only for distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Referring to FIG. 1, a shape display device 10 according to an embodiment of the present invention is disclosed. The shape display device 10 according to the embodiment of the present invention may include a plurality of rods 60 and a plurality of couplers 50.

The plurality of rods 60 may be connected to each other. One coupler 50 may connect at least three rods 60. A plurality of adjacent connected rods 60 may form a basic cell. The interior of the basic cell can form an empty space. For example, the basic cell of the shape display device 10 may be a hexahedron.

The length of the rod 60 may vary. The length variation of the plurality of rods 60 may be performed individually. When the length of the rod 60 is changed, the overall shape of the shape display device 10 may be changed. For example, the rods 60 of lower portion of the shape display device 10 may have a relatively longer length than the rods 60 of upper portion of the shape display device 10. For example, the shape of the shape display device 10 may be changed from a cubic shape to a shape of a part of a pyramid.

Figure 2:
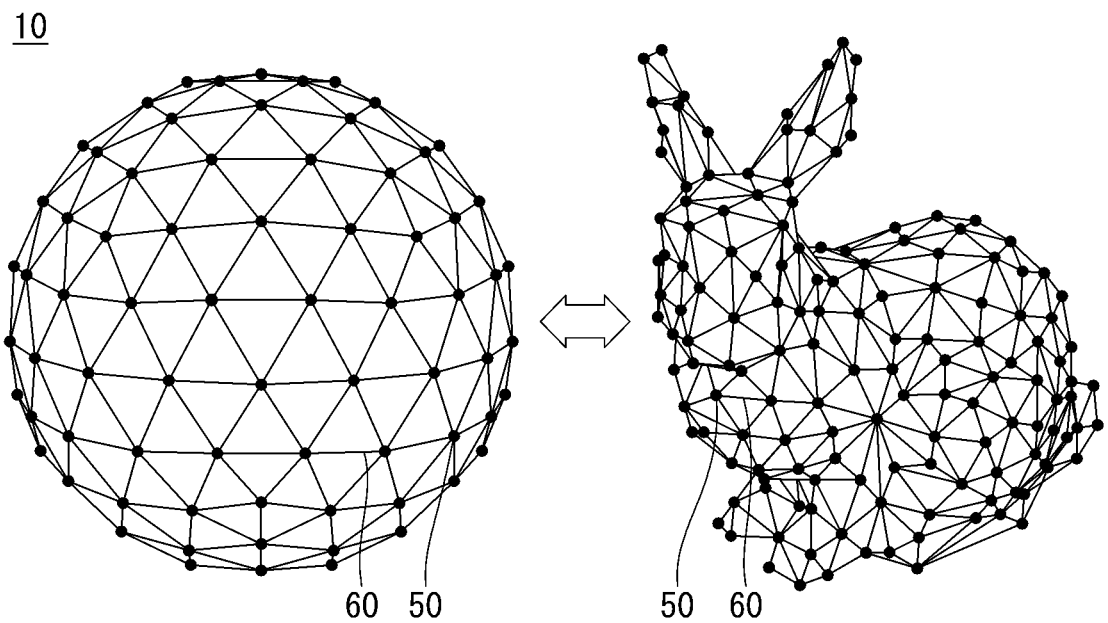

Referring to FIG. 2, the shape display device 10 according to an embodiment of the present invention may include a plurality of rods 60 and a plurality of couplers 50. A plurality of adjacent connected rods 60 may form a basic cell. The basic cell of the shape display device 10 according to an embodiment of the present invention may be, for example, a tetrahedron. In FIG. 2, representation of tetrahedron is omitted for convenience.

The tetrahedron may be formed by connecting four rods 60. The shape of the tetrahedron depends on the length of the four rods 60 connected. When the lengths of the four rods 60 are respectively determined, the shape of the tetrahedron may be determined. The tetrahedron may be a basic cell of the shape display device 10. Therefore, when the lengths of the plurality of rods 60 constituting the shape display device 10 are determined, the shape of the shape display device 10 may be determined.

Referring to FIG. 3 (a), a universal joint typed coupler 51 is disclosed. The universal joint typed coupler 51 may be connected to a plurality of rods 60. The universal joint typed coupler 51 may be operated by two pin joints crossing each other at a single point. The universal joint typed coupler 51 may include a node 51a and a joint 51b. The joint 51b may link or connect the rod 60 and the node 51a. The rod 60 may rotate on the node 51a via the joint 51b.

Referring to FIG. 3 (b), a magnetic joint typed coupler 52 is disclosed. The magnetic joint typed coupler 52 may use magnetic force. The magnetic joint typed coupler 52 may be connected to a plurality of rods 60. The magnetic joint typed coupler 52 may include a node 52a. The node 52a may have a spherical shape. The magnetic joint typed coupler 52 may be magnetically coupled to the plurality of rods 60. A joint of the magnetic joint typed coupler 52 may be formed at a boundary between the node 52a and the rod 60.

At least one of the node 52a and the rod 60 may comprise a magnet. For example, the node 52a may comprise a magnet and the rod 60 may comprise a metal. The metal contained in the rod 60 may be located at the end of the rod 60. In another example, the node 52a may comprise a metal and the rod 60 may comprise a magnet. The magnet contained in the rod 60 may be located at the end of the rod 60.

Referring to FIG. 3 (c), the ball joint typed coupler 53 is disclosed. The ball joint typed coupler 53 may be connected to the plurality of rods 60. The ball joint typed coupler 53 may include a node 53a and a joint 53b. The rod 60 connected to the ball joint typed coupler 53 may have at least one rotational degree of freedom. For instance, the degree of freedom of the rod 60 with respect to the node 53a, may be 2.

Although not shown in FIG. 3, a coupler using a flexible material may be considered. The flexible material may include, for example, polyurethane. The coupler formed of polyurethane may be connected to the rod 60.

Although not shown in FIG. 3, a spherical electromagnet node can be considered. The spherical electromagnet node may have an appearance similar to the appearance of the node 52a shown in FIG. 3 (b). A plurality of solenoids may be positioned inside the spherical electromagnet node. A ferromagnetic material may be disposed inside a plurality of solenoids. The plurality of solenoids may have different lengthwise directions. When electric current flows through a plurality of solenoids, a plurality of solenoids may form a magnetic force. The electric currents applied to the plurality of solenoids can be individually controlled.

Referring to FIGS. 4 to 8, the case 500 may be referred to as a main frame.

Figure 4:
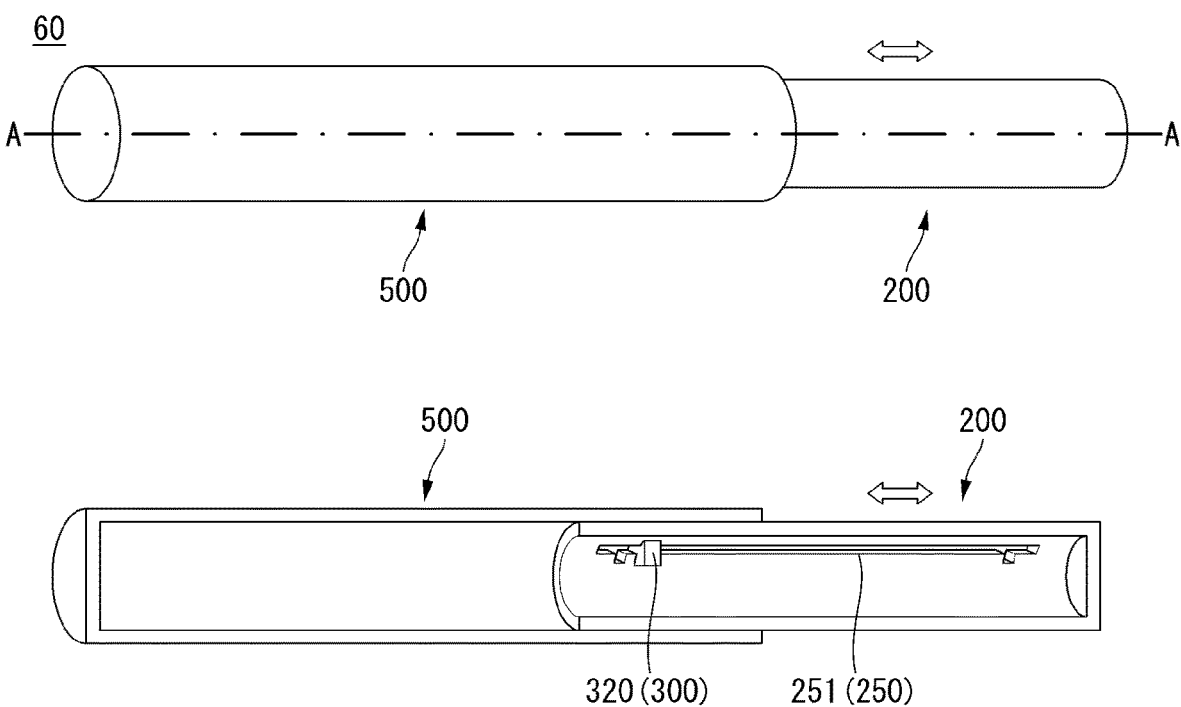
FIGS. 4 to 8 are views illustrating rods according to various embodiments of present invention.

Referring to FIG. 4, the rod 60 may include a case 500 and a subframe 200. The case 500 may form a hollow portion. The case 500 may have a shape of a polygonal column or a cylinder.

The subframe 200 may be located inside the case 500. The subframe 200 can be drawn out from the case 500. The subframe 200 may be inserted into the case 500. The subframe 200 may have a shape corresponding to the case 500. The outer surface of the subframe 200 may correspond to the inner surface shape of the case 500.

The rod 60 may include a driver 300. For example, the driver 300 may include a piezoelectric motor 320. The piezoelectric motor 320 may be mounted on the case 500. The piezoelectric motor 320 may consume power to produce linear kinetic energy.

The rod 60 may include a power connection portion 250. For example, the power connection portion 250 may include a guide bar 251. The guide bar 251 may be installed in the subframe 200. The lengthwise direction of the guide bar 251 may be parallel to the lengthwise direction of the subframe 200. The guide bar 251 may be connected to the piezoelectric motor 320. The guide bar 251 may be connected to the piezoelectric motor 320. The guide bar 251 may be provided with linear kinetic energy from the piezoelectric motor 320.

Figure 5:
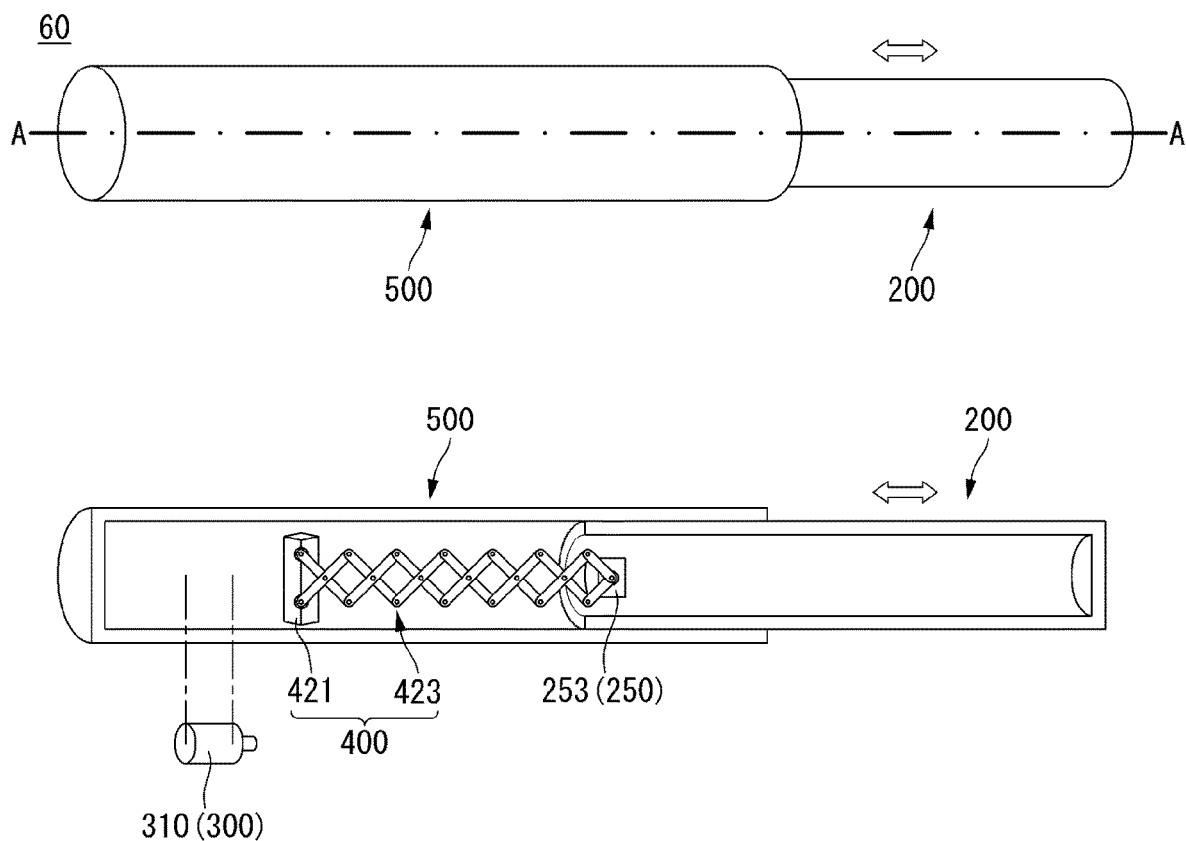

Referring to FIG. 5, the rod 60 may include a power transmission portion 400. The power transmission portion 400 may be installed in the case 500. The power transmission portion 400 may be connected to the driver 300. The power transmission portion 400 may be provided with a driving force by the driver 300. The power transmission portion 400 may be connected to the subframe 200. The power transmission portion 400 may provide the driving force to the subframe 200.

The power transmission portion 400 may include a power conversion portion 421 and a linear connection portion 423. The power conversion portion 421 may be installed inside the case 500. The power conversion portion 421 may be connected to the driver 300. The power conversion portion 421 may be provided with a driving force from the driver 300. For example, the power conversion portion 421 may be provided with a rotational force from the driver 300. For example, the power conversion portion 421 may convert the rotational motion into a linear motion. The power conversion portion 421 may be connected to the linear connection portion 423.

The linear connection portion 423 may connect the power conversion portion 421 and the subframe 200. The linear connection portion 423 may be connected to the power connection portion 250 installed in the subframe 200. The linear connection portion 423 may include a plurality of pins and a plurality of hinges. The linear connection portion 423 may have the shape of a part of a scissor lift.

The linear connection portion 423 may be provided with a linear motion in a first direction from the power conversion portion 421. The linear connection portion 423 may provide the power connection portion 250 with a linear movement in a second direction. The first direction and the second direction may be different from each other. For example, the first direction may be parallel to the radial direction of the rod 60 and the second direction may be parallel to the lengthwise direction of the rod 60.

The power connection portion 250 may include a connection shaft 253. The connection shaft 253 may be connected to the linear connection portion 423. The pin of the linear connection portion 423 may be rotatably connected to the connection shaft 253. The connection shaft 253 may be installed in the subframe 200.

The driver 300 may include a rotation motor 310. The rotation motor 310 may be installed in the case 500. The rotation motor 310 may be connected to the power conversion portion 421. The rotation motor 310 may provide rotational force to the power conversion portion 421. The power conversion portion 421 may convert the rotational force into a linear force.

Figure 6:
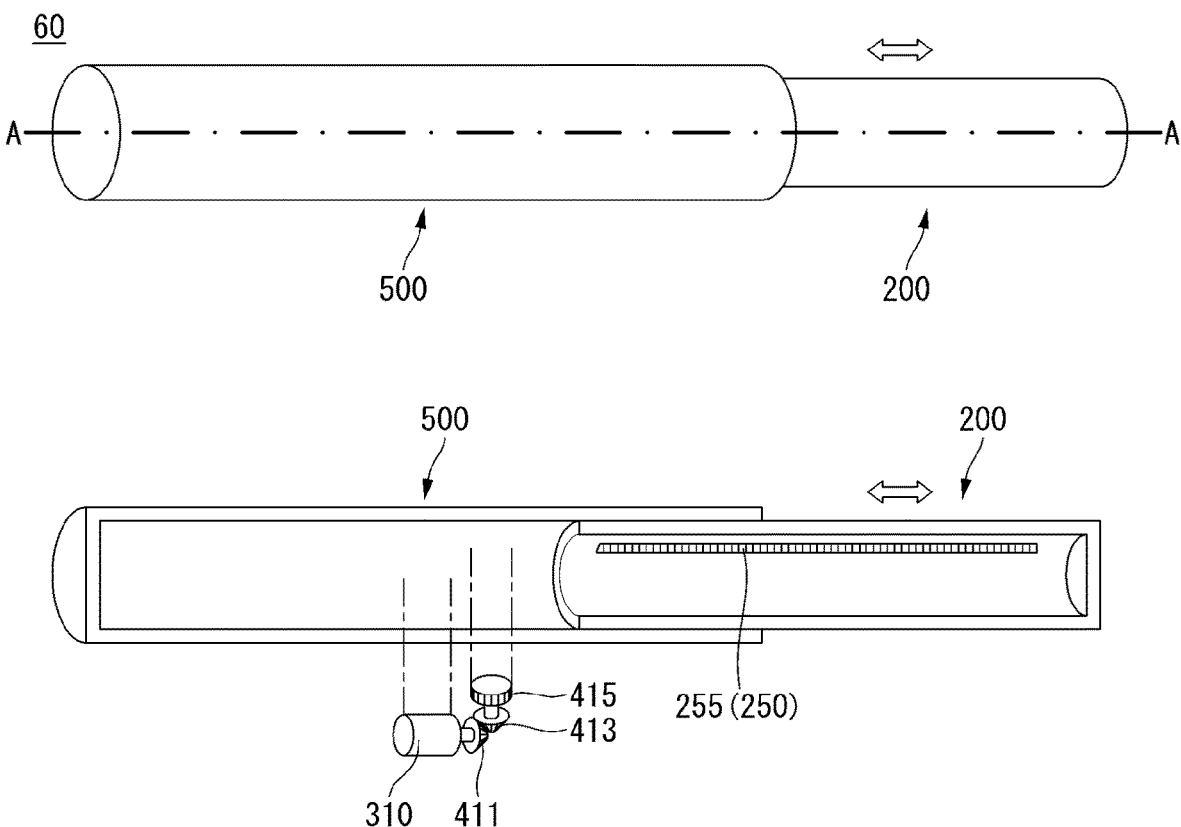

Referring to FIG. 6, the power connection portion 250 may include a rack gear 255. The rack gear 255 may be installed in the subframe 200. The rotation motor 310 may be mounted on the case 500. The first bevel gear 411 may be connected to or mounted on the rotation motor 310. The second bevel gear 413 may be engaged with the first bevel gear 411. The pinion gear 415 may be connected to the second bevel gear 413. The pinion gear 415 may extend from the second bevel gear 413. The pinion gear 415 and the second bevel gear 413 may be coaxial. The bevel gear 411 and 413 may mean at least one of the first bevel gear 411 or the second bevel gear 413.

The rotation motor 310 may provide rotational force to the first bevel gear 411. The first bevel gear 411 may transmit the rotational force to the second bevel gear 413. The second bevel gear 413 may change the direction of the rotational force provided from the first bevel gear 413. For example, the direction in which the subframe 200 is drawn out from the case 500 may be the reference direction. For example, the first bevel gear 411 may provide the second bevel gear 413 with a rotational force in the roll direction with respect to the reference direction. The second bevel gear 413 may provide the pinion gear 415 with a rotational force in the pitch direction with respect to the reference direction. The pinion gear 415 may provide the rotational force to the rack gear 255. The rack gear 255 may convert the rotational force into a linear motion.

Figure 7:
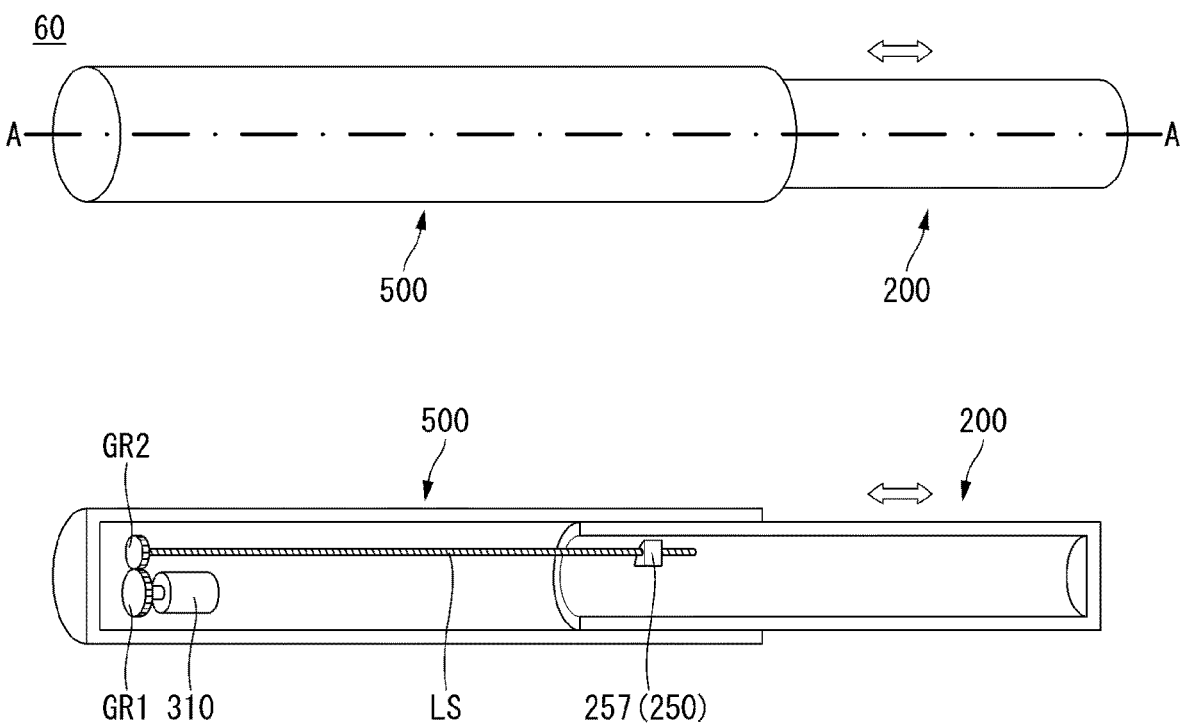

Referring to FIG. 7, the rotation motor 310 may be installed in the case 500. The first gear GR1 may be mounted on the rotation motor 310. The second gear GR2 may be installed in the case 500. The second gear GR2 may be engaged with the first gear GR1. The lead screw LS may be connected to the second gear GR2. The lead screw LS may be coaxial with the second gear GR2. The lead screw LS may be formed integrally with the second gear GR2.

The screw guide 257 may be installed in the subframe 200. The lead screw LS may penetrate the screw guide 257. The screw guide 257 may be engaged with the lead screw LS.

The rotation motor 310 may provide rotational force to the first gear GR1. The second gear GR2 may receive the rotational force from the first gear GR1 and transmit the rotational force to the lead screw LS. The screw guide 257 may convert the rotational force received from the lead screw LS into a linear motion.

The screw guide 257 may be connected to the rotation motor 310. In this case, loss of power which happens from the first gear GR1 to second gear GR2, may be decreased.

Although not shown in the drawings, the case 500 may guide the motion of the subframe 200. The case 500 may include a structure for guiding the subframe 200. For example, the case 500 may include a groove or a projection. For example, the subframe 200 may include a protrusion or a groove corresponding to the groove or the projection included in the case 500.

Figure 8:
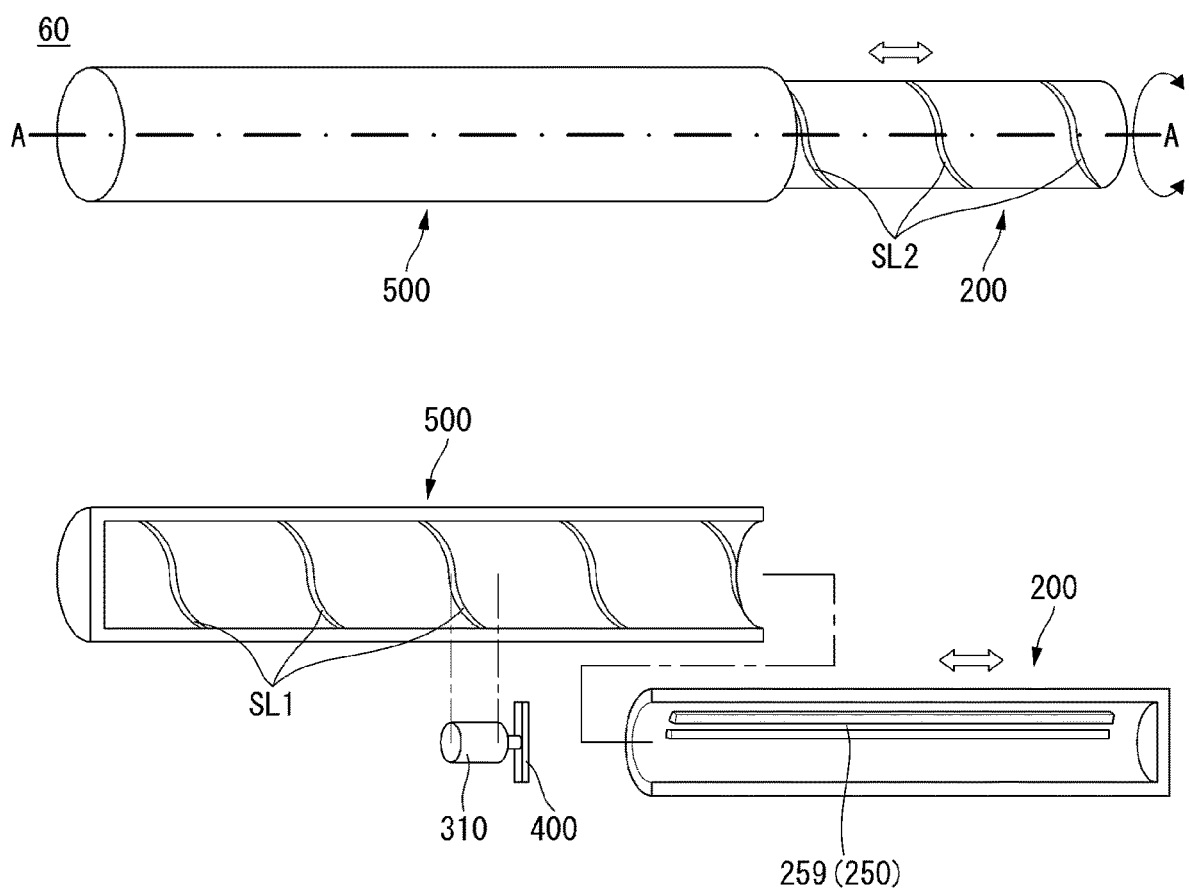

Referring to FIG. 8, the rotation motor 310 may be installed in the case 500. The power transmission portion 400 may be mounted on the rotation motor 310. The power transmission portion 400 may have a shape extending in a direction away from the axis of the rotation motor 310. The power transmission portion 400 may transmit the rotational force to the subframe 200.

The power connection portion 250 may include a rail 259. The rail 259 may have a shape protruding from the inner surface of the subframe 200. The rail 259 may be formed to be parallel to the drawing-out direction of the subframe 200. The rail 259 may be contact with the power transmission portion 400. The rail 259 may be provided with a rotational force from the power transmission portion 400.

The power transmission portion 400 may be coupled with the rail 259. For example, a part of the power transmission portion 400 may be fitted in the rail 259. The rail 259 may form a space in which the power transmission portion 400 is fitted.

The first screw thread SL1 may be formed on the inner surface of the case 500. The first screw thread SL1 may have a shape protruding from the inner surface of the case 500 or may have a depressed shape on the inner surface of the case 500. The first screw thread SL1 may have a constant pitch angle.

And the second screw thread SL2 may be formed on the outer surface of the subframe 200. The second screw thread SL2 may have a shape protruding from the outer surface of the subframe 200 or may have a depressed shape. The second screw thread SL2 may correspond to the shape of the first screw thread SL1. For example, the first screw thread SL1 may have a protruding shape and the second screw thread SL2 may have a recessed shape. And the second screw thread SL2 may be positioned corresponding to the first screw thread SL1.

The rotation motor 310 may provide a rotational force to the power transmission portion 400. The power transmission portion 400 may transmit the rotational force to the rail 259. The rail 259 may transmit the rotational force to the subframe 200. The subframe 200 may move along the shape of the first screw thread SL1. For example, the subframe 200 may simultaneously perform translational motion and rotational motion.

Figure 9:
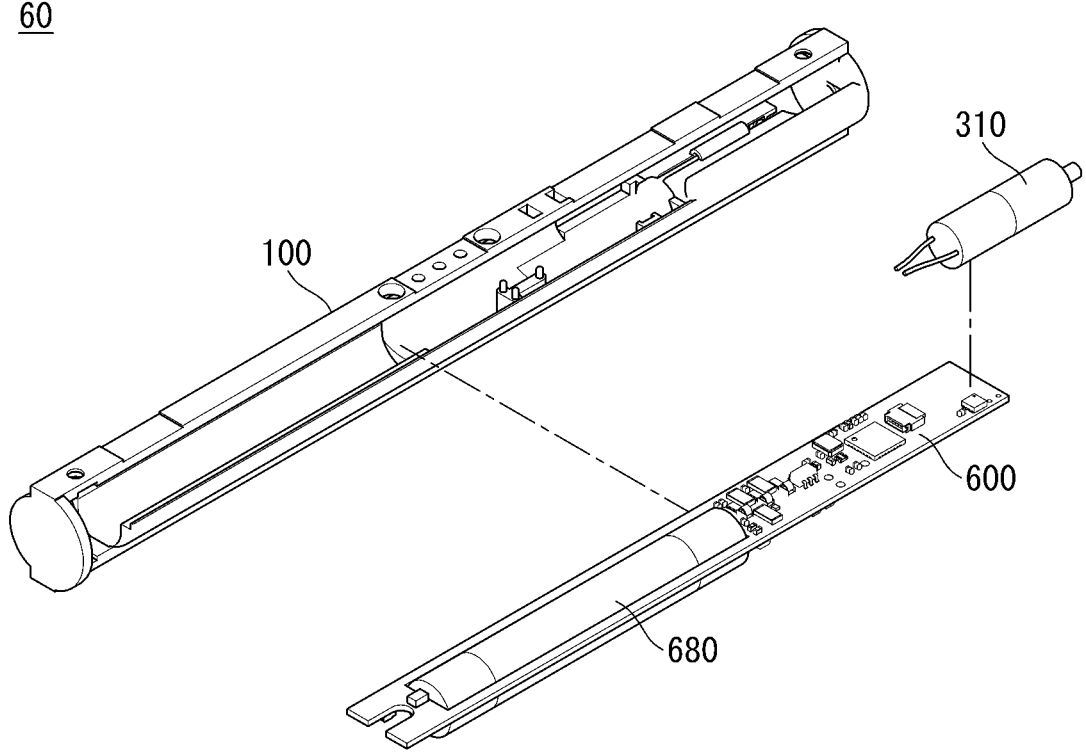
FIGS. 9 to 23 are views illustrating a rod according to an embodiment of the present invention.

Referring to FIG. 9, the rod 60 may include a main frame 100. The main frame 100 may form the overall shape of the rod 60. The main frame 100 may have a cylindrical shape as a whole. The main frame 100 may have an accommodation space therein. The main frame 100 may have high rigidity. The main frame 100 may include carbon fibers or may include metal alloys. The orientation of the rod 60 may be based on the orientation of the main frame 100.

A circuit board 600 may be accommodated in the main frame 100. The circuit board 600 may include a PCB 600 or an FPCB 600. A battery 680 may be accommodated in the main frame 100. The battery 680 may be adjacent to the circuit board 600. The battery 680 may be chargeable. The battery 680 may be electrically connected to the circuit board 600. The battery 680 may provide electric power to the circuit board 600.

The circuit board 600 may include a communication module. For example, the communication module may include a short-range communication module and/or a long-range communication module. The short-range communication module can perform Wi-Fi communication and/or Bluetooth communication. The long-range communication module is capable of LTE communication and/or 5G communication. The communication module may access the network.

The circuit board 600 may include a temperature sensor. The temperature sensor may acquire the ambient temperature. The circuit board 600 may be electrically connected to the camera. The camera may acquire images and the like. The camera may be located in the main frame 100.

The rotation motor 310 may be accommodated in the main frame 100. The rotation motor 310 may be electrically connected to the circuit board 600. The rotation motor 310 may be controlled by the circuit board 600.

Figure 10:
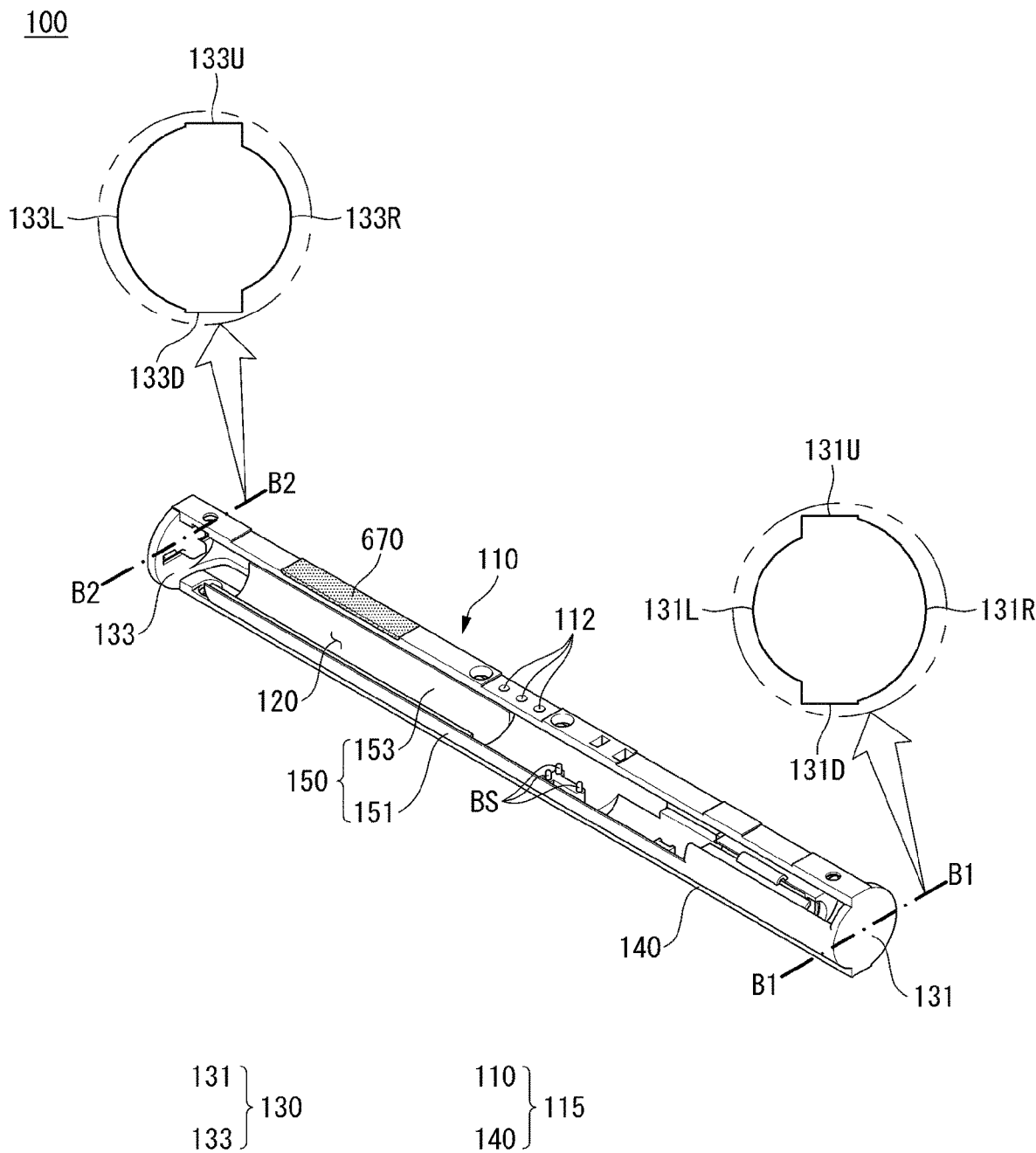

Referring to FIG. 10, the main frame 100 may include a first beam 110 and a second beam 140. The first beam 110 and the second beam 140 may have a shape extending in the lengthwise direction of the main frame 100. The first beam 110 may face the second beam 140. The beam 115 may refer to at least one of the first beam 110 and the second beam 140. The first beam 110 may form a fastening opening 112.

A display 670 may be located in the beam 115. For example, the display 670 may be located in the first beam 110. The display 670 may generate light, form colors, or form an image. Although not shown in FIG. 10, a camera may be installed in the first beam 110.

The orientation of the main frame 100 may be based on the orientation of the beam 115. For example, the basic orientation of the main frame 100 may be formed when the first beam 110 is positioned above the second beam 140. Hereinafter, the main frame 100 may be described in the basic orientation.

The main frame 100 may include a first end portion 131 and a second end portion 133. The end portion 130 may refer to at least one of the first end portion 131 and the second end portion 133. The end portion 130 may be located at the ends of the main frame 100. The end portion 130 may form the shapes of both ends of the main frame 100. The end portion 130 may connect the first beam 110 and the second beam 140.

The main frame 100 may include a first cradle 151 and a second cradle 153. The cradle 150 may refer to at least one of the first cradle 151 and the second cradle 153. The cradle 150 may be positioned between the first end portion 131 and the second end portion 133. The cradle 150 may be coupled with the beam 115. For example, the cradle 150 may extend from the second beam 140. For example, the cradle 150 may be spaced apart from the first beam 110. An empty space or an opening or slot may be formed between the cradle 150 and the first beam 110. The cradle 150 may form an accommodation space. The first cradle 151 may be disposed symmetrically with the second cradle 153.

The cross-sectional shape of the first end portion 131 may be observed. Referring to a cross-section of the first end portion 131 taken along the line B1-B1, the shape of the first end portion 131 may be formed by an outline. The shape of the first end portion 131 may include an upper side 131U, a lower side 131D, a left side 131L, and a right side 131R. The upper side 131U of the first end portion 131 may be connected to the first beam 110. The lower side 131D of the first end portion 131 may be connected to the second beam 140. The left side 131L of the first end portion 131 may be connected to the first cradle 151. The right side 131R of the first end portion 131 may be connected to the second cradle 153.

The right side 131R may extend from the upper side 131U and lead to the lower side 131D. The left side 131L may extend from the upper side 131U and be connected to the lower side 131D. The left side 131L may form a stepped portion with the upper side 131U. The left side 131L may form a stepped portion with the lower side 131D. The right side 131R may have a different size from the left side 131L. For example, the left side 131L may have a smaller size than the right side 131R.

The cross-sectional shape of the second end portion 133 may be observed. Referring to the cross-section of the second end portion 133 taken along line B2-B2, the shape of the second end portion 133 may be formed by an outline. The shape of the second end portion 133 may be symmetrical with the first end portion 131. The shape of the second end portion 133 may include an upper side 133U, a lower side 133D, a left side 133L, and a right side 133R. The upper side 133U of the second end portion 133 may be connected to the first beam 110. The lower side 133D of the second end portion 133 may be connected to the second beam 140.

The left side 133L may extend from the lower side 133D and lead to the upper side 133U. The right side 133R may extend from the lower side 133D and be connected to the upper side 133U. The right side 133R may form a stepped portion with the lower side 133D. The right side 133R may form a stepped portion with the upper side 133U. The left side 133L may have a different size from the right side 133R. For example, the right side 133R may have a smaller size than the left side 133L.

The boss BS may be located inside the main frame 100. For example, the boss BS may be located in the second beam 140 or the cradle 150. For example, the boss BS may be fastened to the circuit board 600 (see FIG. 9).

The battery accommodation portion 120 may be located inside the main frame 100. The battery accommodation portion 120 may be part of the accommodation space formed in the main frame 100. The battery 680 (see FIG. 9) may be seated on the battery accommodation portion 120. The battery accommodation portion 120 may be formed by the cradle 150 and the second beam 140.

Figure 11:
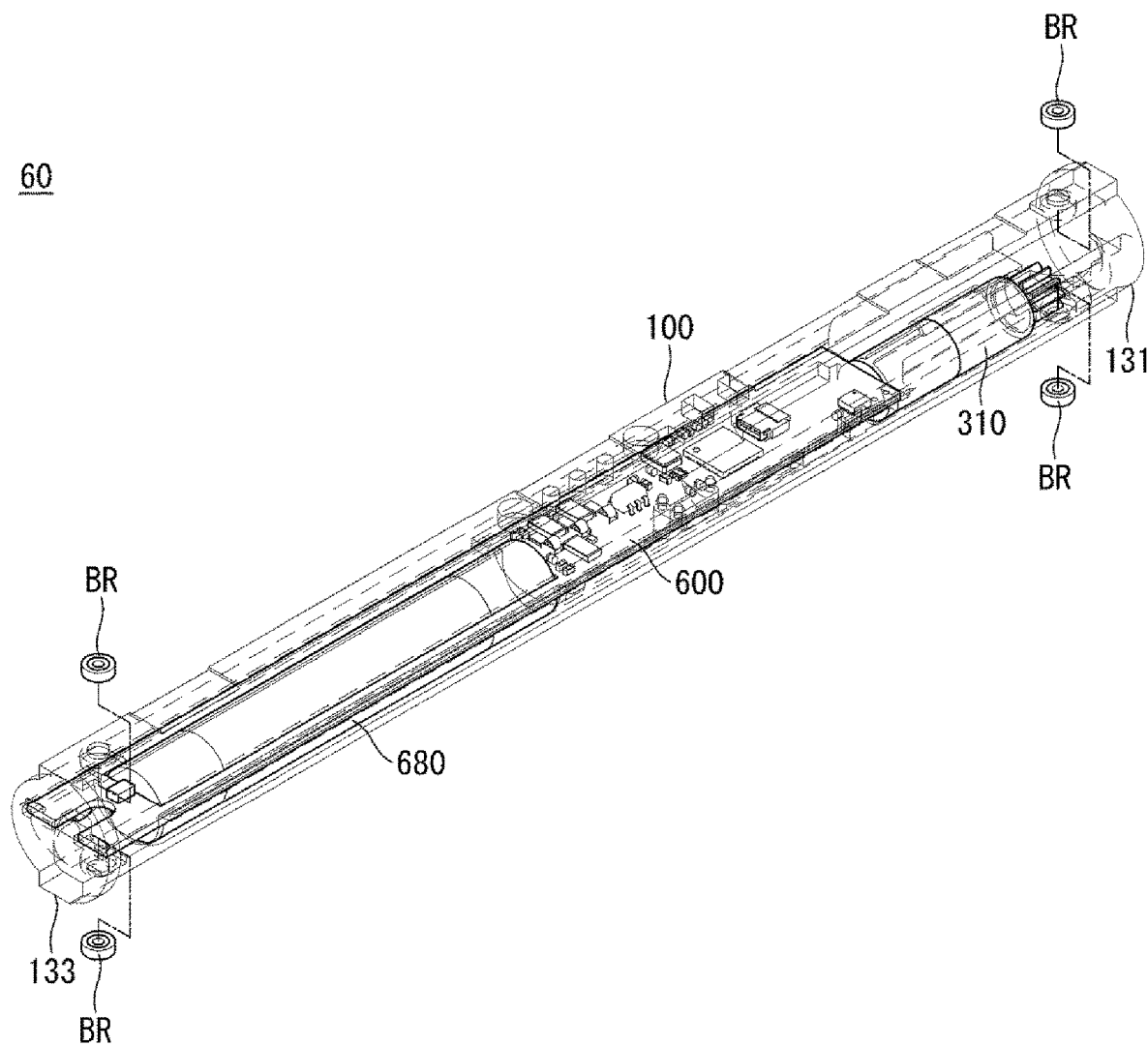

Referring to FIG. 11, a circuit board 600, a rotation motor 310, and a battery 680 may be accommodated in the main frame 100. The rotation motor 310 may be disposed adjacent to the first end portion 131. The battery 680 may be disposed adjacent the second end portion 133. The battery 680 and the rotation motor 310 may have a larger mass or weight than the circuit board 600. The weight distribution or the mass distribution of the rod 60 may be made more uniform when the battery 680 and the rotation motor 310 are disposed adjacent to the second end portion 133 and the first end portion 131, respectively.

A plurality of bearings BR may be installed in the main frame 100. The bearings BR may be arranged in pairs. A pair of bearings BR may be disposed adjacent the first end portion 131 and another pair of bearings BR may be disposed adjacent to the second end portion 133.

Figure 12:
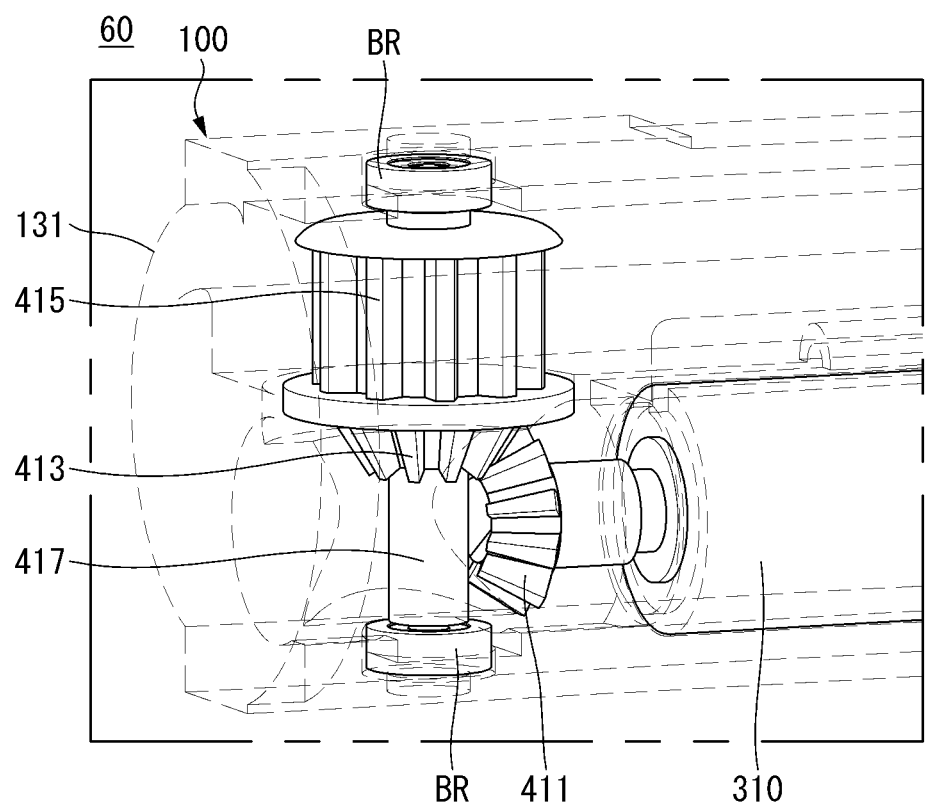

Referring to FIG. 12, the first bevel gear 411 may be mounted on the rotation motor 310. The first bevel gear 411 may be provided with rotational force from the rotation motor 310. The first bevel gear 411 may provide a rotational force to the second bevel gear 413.

The first coupling shaft 417 may be adjacent to the first end portion 131. The first coupling shaft 417 may be fitted in the bearing BR. The second bevel gear 413 may be connected to the first coupling shaft 417. The second bevel gear 413 may be integrally formed with the first coupling shaft 417. The second bevel gear 413 may be coaxial with the first coupling shaft 417. The second bevel gear 413 may be engaged with the first bevel gear 411. The rotation direction of the second bevel gear 413 may be different from the rotation direction of the first bevel gear 411. The direction of rotation of the first bevel gear 411 may be the roll direction and the direction of rotation of the second bevel gear 413 may be the yaw direction, when a direction from the rotation motor 310 to the first bevel gear 411 is referenced.

The first connection gear 415 may be adjacent to the second bevel gear 413. The first connection gear 415 may be coaxial with the second bevel gear 413. The first connection gear 415 may be connected to, for example, a belt.

Figure 13:
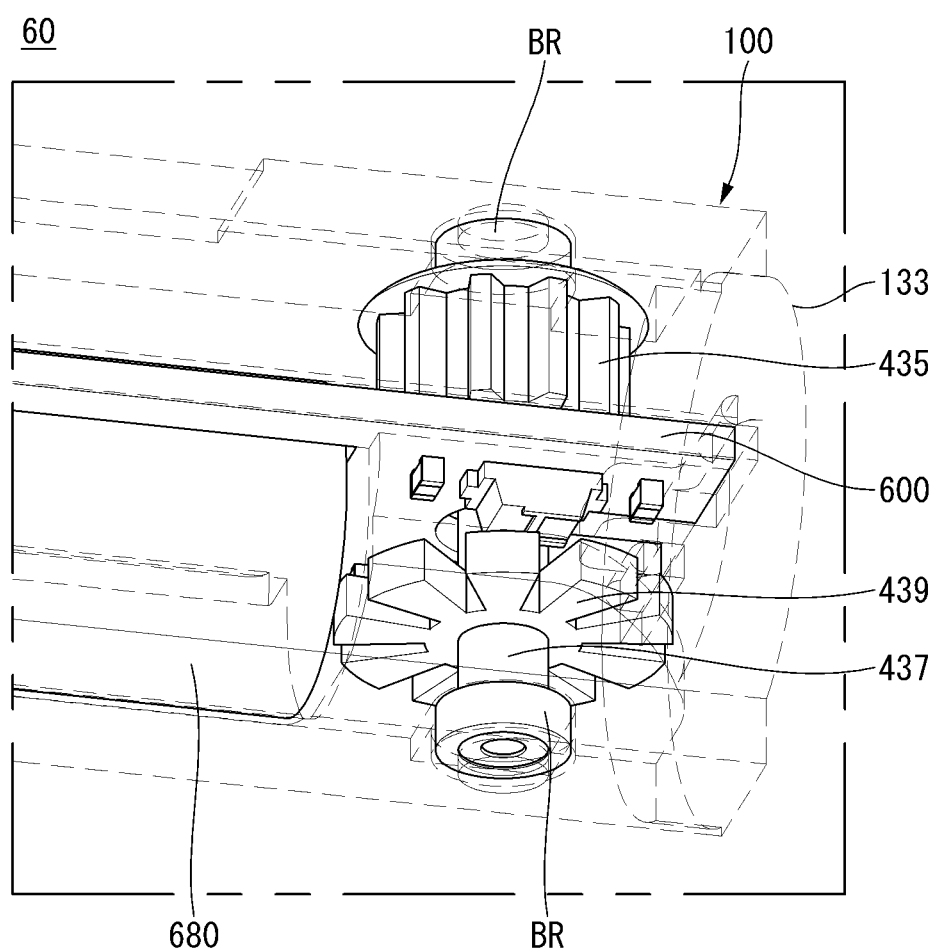

Referring to FIG. 13, the second coupling shaft 437 may be adjacent to the second end portion 133. And the second coupling shaft 437 may be fitted in the bearing BR.

The second connection gear 435 may be connected to the second coupling shaft 437. The second connection gear 435 may be mechanically connected to the first connection gear 415 (see FIG. 12). For example, the second connection gear 435 may be connected to the first gear 415 (see FIG. 12) via a belt.

An encoder wheel 439 may be coupled to the second coupling shaft 437. The encoder wheel 439 may rotate in the same rotation direction as the second connection gear 435. The encoder wheel 439 may be coaxial with the second connection gear 435. The circuit board 600 (see FIG. 11) may acquire information including the rotational state of the second connection gear 435 via the encoder wheel 439.

Figure 14:
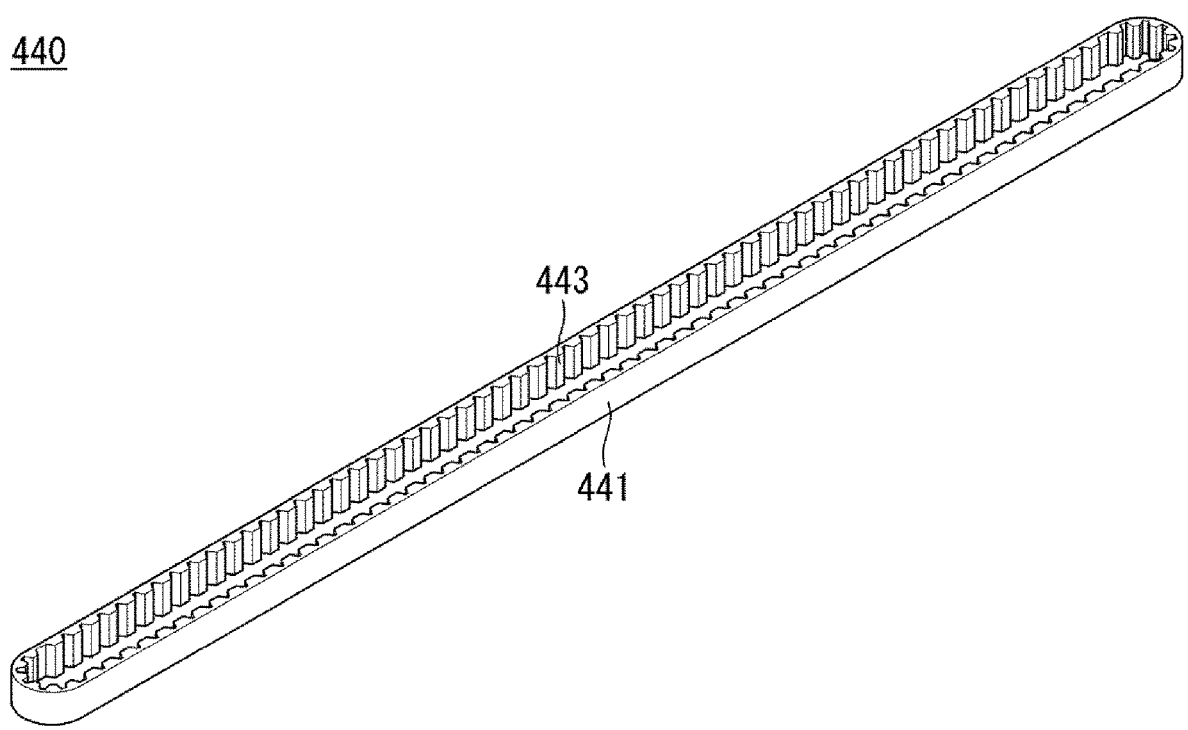

Referring to FIG. 14, a belt 440 is observed. The belt 440 may include a belt body 441 and a belt protrusion 443. The belt body 441 may have the shape of a ring. The belt body 441 may have an outer surface and an inner surface. For example, the outer surface of the belt body 441 may face the outside of the belt 440. For example, the inner surface of the belt body 441 may face a portion of the belt 440.

The belt protrusion 443 may be located on one side of the belt body 441. For example, the belt protrusion 443 may be located on the inner surface of the belt body 441. A plurality of belt protrusions 443 may be arranged. The plurality of belt protrusions 443 may have a predetermined shape. The plurality of belt protrusions 443 may be disposed at regular intervals.

Figure 15:
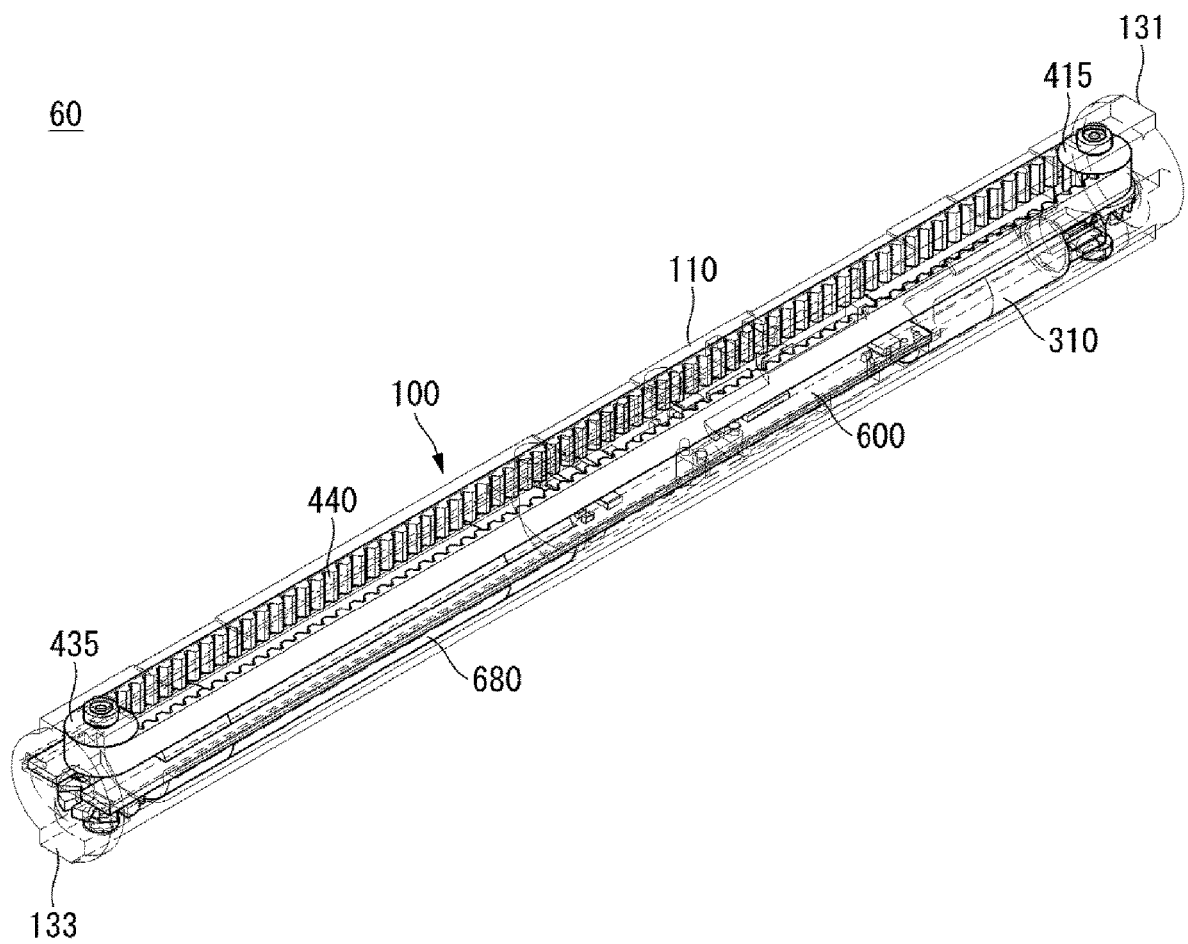

Referring to FIG. 15, the belt 440 may be connected to the first connection gear 415 and the second connection gear 435. The belt protrusion 443 (see FIG. 14) formed on the belt 440 may be engaged with the first connection gear 415 and the second connection gear 435.

The first connection gear 415 may be provided with rotational force from the rotation motor 310. The belt 440 may be moved by the first connecting gear 415. The second connection gear 435 may be moved by the belt 440. The second connection gear 435 may rotate.

The movement and position of the belt 440 may be described with respect to one point of the belt 440. The one point of the belt 440 may be coupled with the first connection gear 415. The one point of the belt 440 may be provided with a driving force from the first connection gear 415. The one point of the belt 440 can move from the first connection gear 415 toward the second connection gear 435. The one point of the belt 440 may be located between the first connection gear 415 and the second connection gear 435. The one point of the belt 440 may be located between the second cradle 153 (see FIG. 10) and the first beam 110 (see FIG. 10).

One point of the belt 440 may engage the second connection gear 435. The one point of the belt 440 may move from the second connection gear 435 toward the first connection gear 415. The one point of the belt 440 may be located between the first cradle 151 (see FIG. 10) and the first beam 110 (see FIG. 10).

Figure 16:
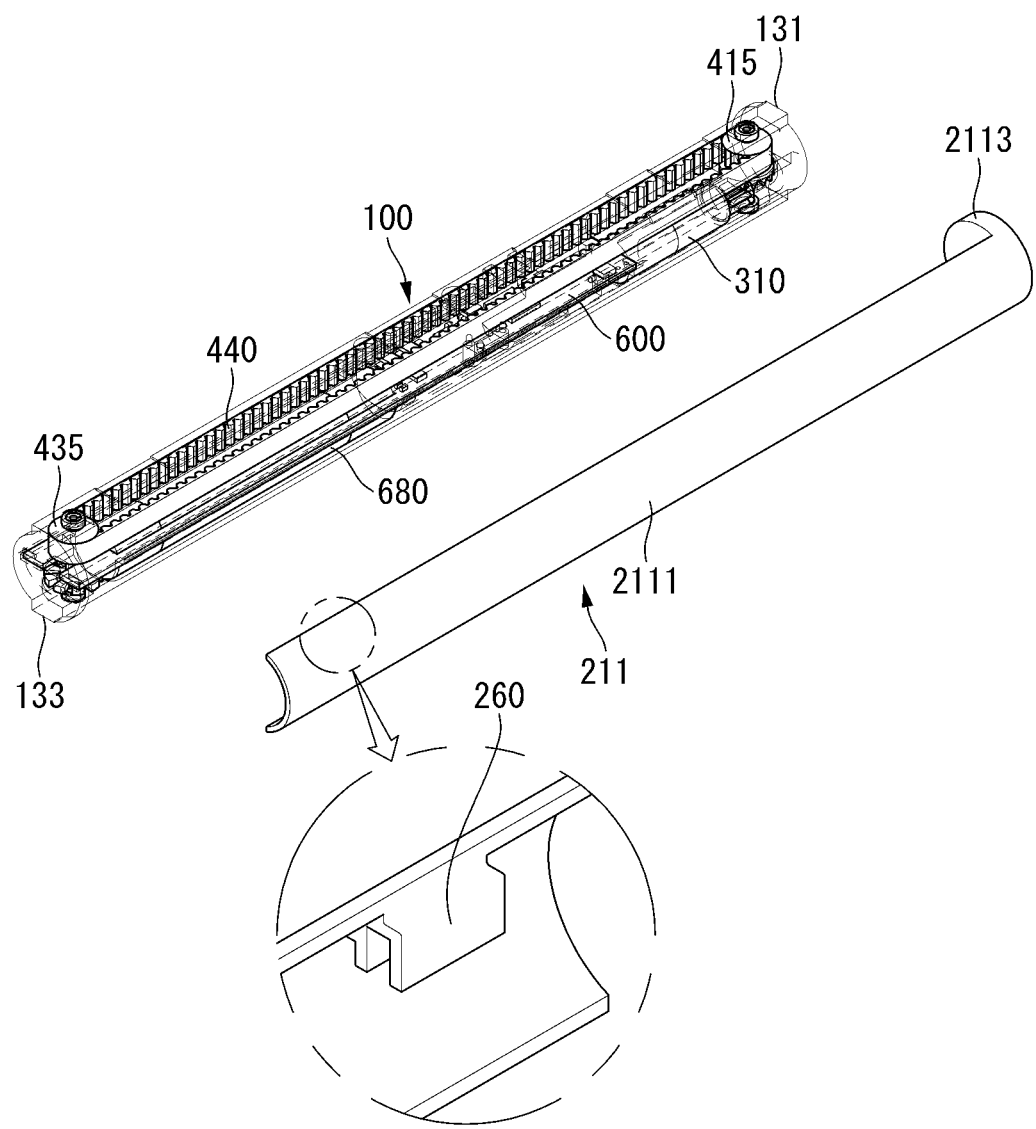

Referring to FIG. 16, the rod 60 may include a first slider 211. The power connection portion 260 may be located in the first slider 211. The power connection portion 260 may be coupled with the belt 440. The power connection portion 260 may receive power from the belt 440 and transmit the power to the first slider 211.

The first slider 211 may be disposed on the main frame 100. The first slider 211 may move on the main frame 100. The first slider 211 may be powered by the belt 440. The first slider 211 may be referred to as a subframe.

When the first slider 211 is mounted on the main frame 100, the power connection portion 260 connected to the first slider 211 may be adjacent to the second end portion 133. The power connection portion 260 may be located between the first cradle 151 (see FIG. 10) and the first beam 110 (see FIG. 10).

The first slider 211 may include a first slider body 2111 and a first slider cap 2113. The first slider body 2111 may face the first cradle 151 (see FIG. 10). The first slider body 2111 may extend in the lengthwise direction of the main frame 100.

The first slider cap 2113 may be connected to the first slider body 2111. When the first slider 211 is mounted on the main frame 100, the first slider cap 2113 may be located at the first end portion 131. The first slider cap 2113 may cover the first end portion 131. The first slider cap 2113 may have a shape corresponding to the first end 1 portion 131.

Figure 17:
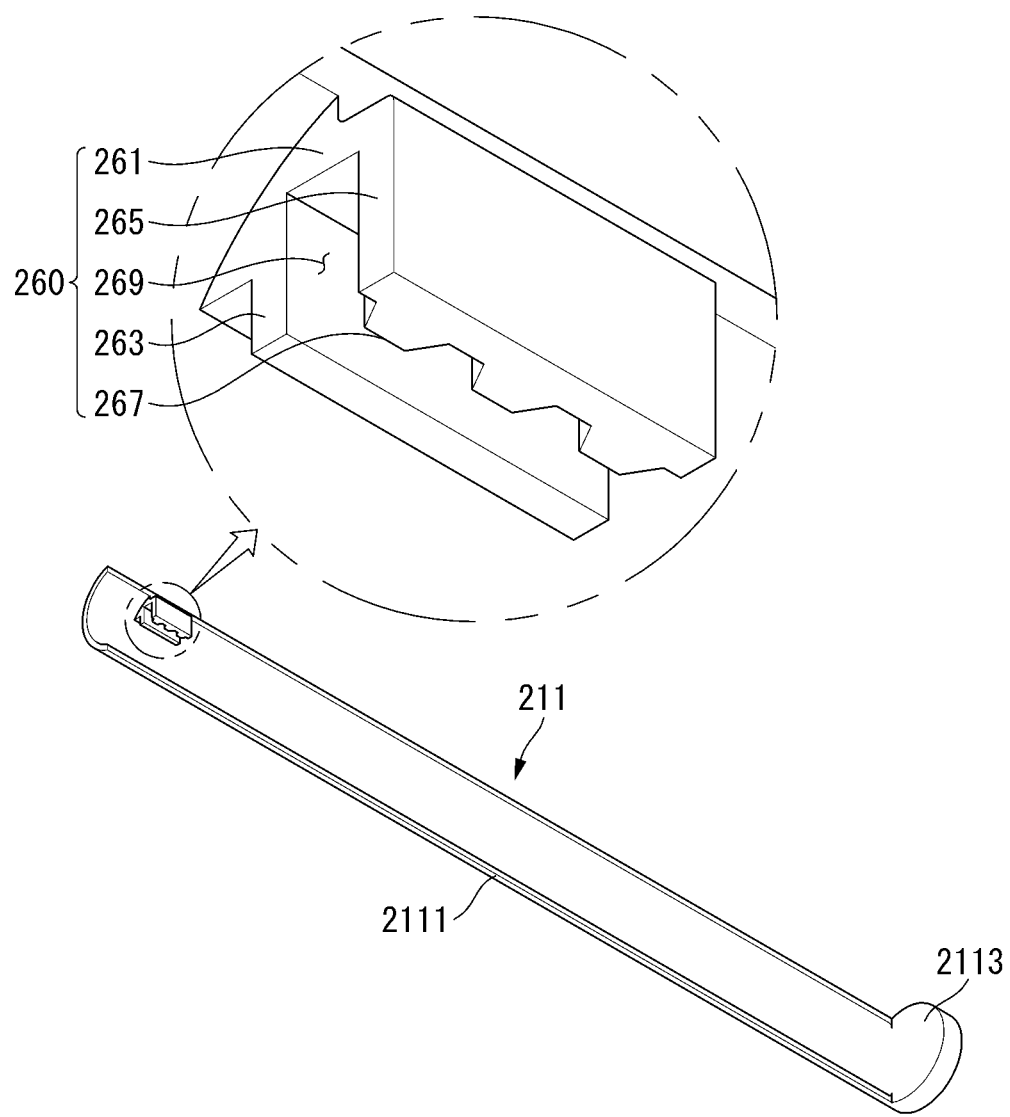
Figure 18:
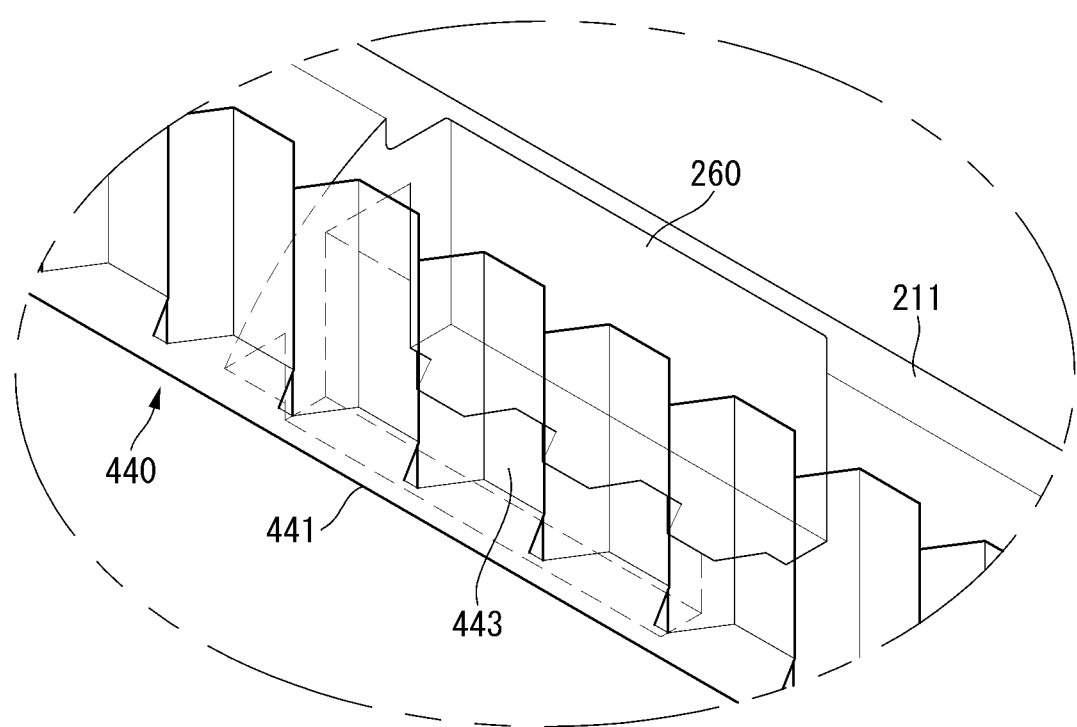

Referring to FIGS. 17 and 18, the power connection portion 260 may include a base 261, a first wall 263, a second wall 265, and a projection 267. The base 261 may be adjacent to an edge of the first slider body 2111.

The first wall 263 may extend from the base 261 toward another edge of the first slider body 2111. The first wall 263 may correspond to the outer surface of the belt body 441. The second wall 265 may extend from the base 261 toward the other edge of the first slider body 2111. The second wall 265 may be spaced apart from the first wall 263. The first wall 263 may be positioned between the second wall 265 and the first slider body 2111. The projection 267 may protrude from the second wall 265 toward the first wall 263. The number of the projections 267 may be plural. The protrusion 267 and the second wall 265 may correspond to the inner surface of the belt 440. The projection 267 of the first wall 263 may correspond to the belt protrusion 443.

A fitting space 269 may be formed between the first wall 263 and the second wall 265. The shape of the fitting space 269 may correspond to a portion of the belt 440. The belt 440 may be fitted and accommodated in the fitting space 269.

Figure 19:
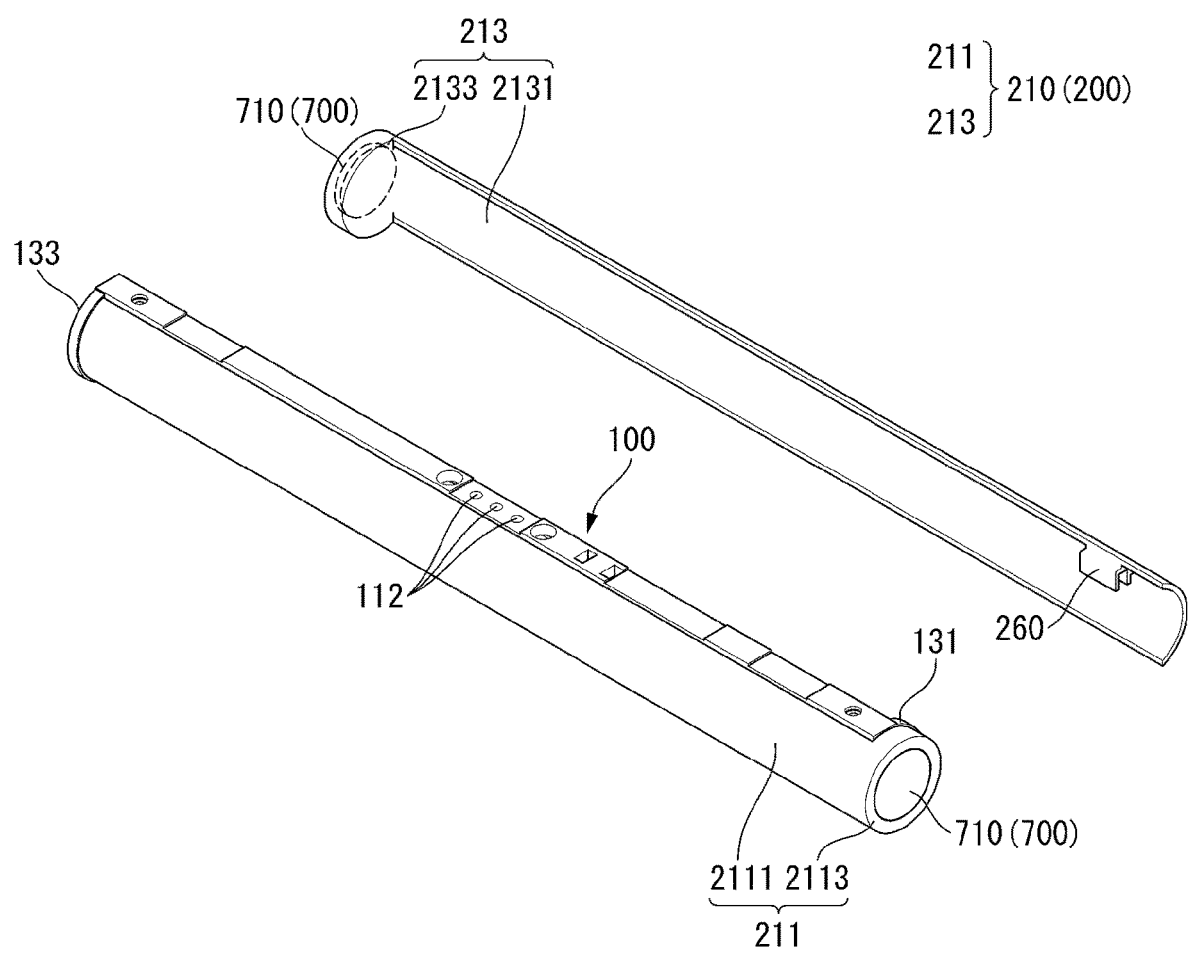

Referring to FIG. 19, the first slider 211 may be mounted on the main frame 100. The second slider 213 may be mounted on the main frame 100. The second slider 213 may be disposed symmetrically with respect to the first slider 211 with respect to the main frame 100. The second slider 213 may be referred to as a subframe. The slider 211 and 213 may denote at least one of the first slider 211 and the second slider 213.

The second slider 213 may include a second slider body 2131 and a second slider cap 2133. The second slider body 2131 may extend in the lengthwise direction of the main frame 100. When the second slider 213 is mounted on the main frame 100, the second slider body 2131 may face the second cradle 153 (see FIG. 10).

The second slider cap 2133 may be connected to the second slider body 2131. When the second slider 213 is mounted on the main frame 100, the second slider cap 2133 may be located at the second end portion 133. The second slider cap 2133 may cover the second end portion 133. The second slider cap 2133 may have a shape corresponding to the second end portion 133.

When the second slider 213 is mounted on the main frame 100, the power connection portion 260 connected to the second slider 213 may be adjacent to the first end portion 131. When the second slider 213 is mounted on the main frame 100, the power connection portion 260 connected to the second slider body 2131 may be located between the first beam 110 (see FIG. 10) and the second cradle 153 (see FIG. 10). The power connection portion 260 connected to the second slider 213 may be fastened to the belt 440 (see FIG. 18). The slider cap 2113 and 2133 may refer to at least one of the first slider cap 2113 and the second slider cap 2133.

The node link portion 700 may be located in the first slider cap 2113 and/or the second slider cap 2133. The node link portion 700 may include, for example, a metal that can magnetically couple with the magnet. The node link portion 700 may include a magnet 710 capable of forming a magnetic force line, for example.

The magnets 710 may be provided in plural. The magnets 710 may be disposed in the slider caps 2113 and 2133. The shape of the magnet 710 may correspond to the shape of the slider caps 2113 and 2133. For example, the magnets 710 may have the shape of a circular disk. The outer periphery of the magnets 710 may be surrounded by the slider caps 2113 and 2133.

Figure 20:
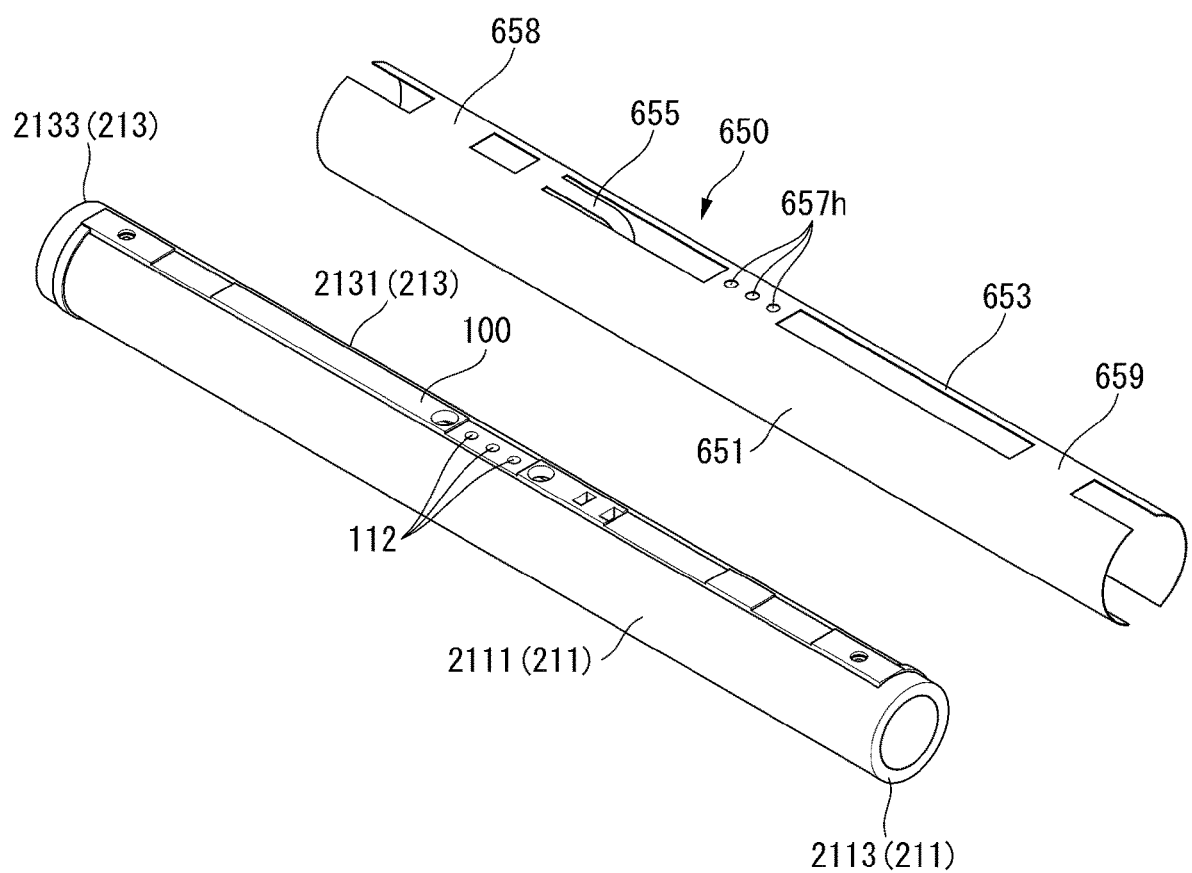

Referring to FIG. 20, the first slider 211 and the second slider 213 may be mounted on the main frame 100. The main frame 100 may be positioned between the first slider 211 and the second slider 213.

The rod 60 may include a sensor pad 650. The sensor pad 650 may sense the approach of an external object. For example, the sensor pad 650 may detect the approach of the human body by using electric capacitive sensing. The sensor pad 650 may be referred to as a proximity sensor pad 650. The sensor pad 650 may include a first pad 651 and a second pad 653. The first pad 651 may face the first slider body 2111. The first pad 651 may be located on the outer surface of the first slider body 2111. The second pad 653 may face the second slider body 2131. The second pad 653 may be positioned on the outer surface of the second slider body 2131. The sensor pad 650 may include a metal.

The sensor pad 650 may have the shape of a cylinder having a hollow space as a whole. The sensor pad 650 may cover the main frame 100, the first slider 211, and the second slider 213. The main frame 100, the first slider 211, and the second slider 213 may be fitted and accommodated in the sensor pad 650.

The sensor pad 650 may include connection portions 657, 658, and 659. The connection portions 657, 658, and 659 may connect the first pad 651 and the second pad 653. The connection portions 657, 658, and 659 may be positioned between the first pad 651 and the second pad 653.

The connection portions 657, 658, and 659 may include a first connection portion 657, a second connection portion 658, and a third connection portion 659. The first connection portion 657 may form at least one hole 657h. The holes 657h formed in the first connection portion 657 may be disposed corresponding to the fastening openings 112 formed in the main frame 100. The first connection portion 657 may be located between the second connection portion 658 and the third connection portion 659.

An access portion 655 may be connected to at least one of the first pad 651 and the second pad 653. For example, the access portion 655 may connect the first pad 651 and the second pad 653. The access portion may be connected to the circuit board 600 (see FIG. 11) electrically. The access portion may have an elasticity or resiliency. The access portion 655 may include a metal.

Figure 21:
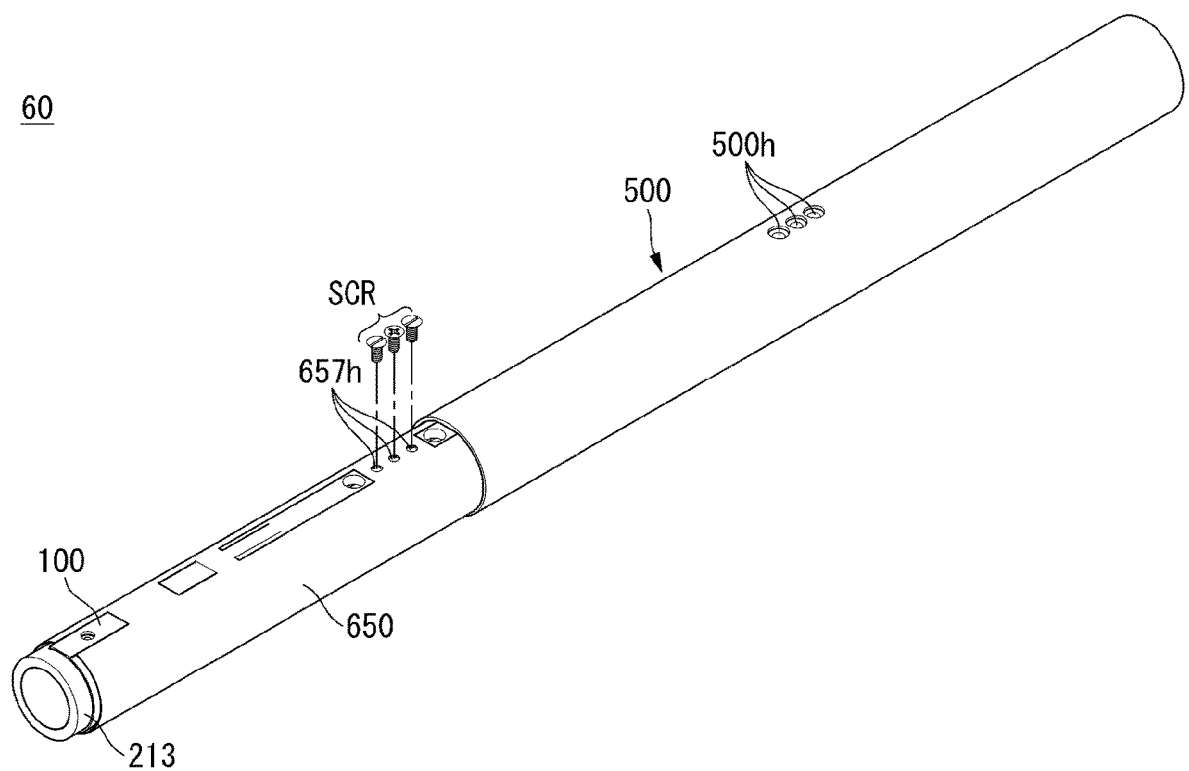

Referring to FIG. 21, the rod 60 may include a case 500. The case 500 may have the shape of a cylinder having a hollow space. The hollow space may have a shape in which both sides are open. The main frame 100, the slider 210, and the sensor pad 650 may be accommodated in the case 500.

At least a portion of the case 500 may be transparent. At least a portion of the case 500 may pass light. Light or an image emitted from the display 670 (see FIG. 10) can be observed from the outside through the transparent portion (not shown) of the case 500. Or light emitted from the display 670 (see FIG. 10) or an image may be observed at the outside through an opening (not shown) formed in the case 500. The camera installed in the main frame 100 may acquire an image from the outside through the transparent part of the case 500. The camera installed in the main frame 100 can acquire an image from the outside through an opening (not shown) formed in the case 500. The transparent portion of the case 500 or the opening of the case 500 may be referred to as a window of the case 500.

A case hole 500h may be formed on the surface of the case 500. The case holes 500h may be formed corresponding to the holes 657h formed in the sensor pad 650. The screws SCR may be fitted into the case holes 500h. The screws SCR may fasten the case 500, the sensor pad 650, and the main frame 100.

Figure 22:
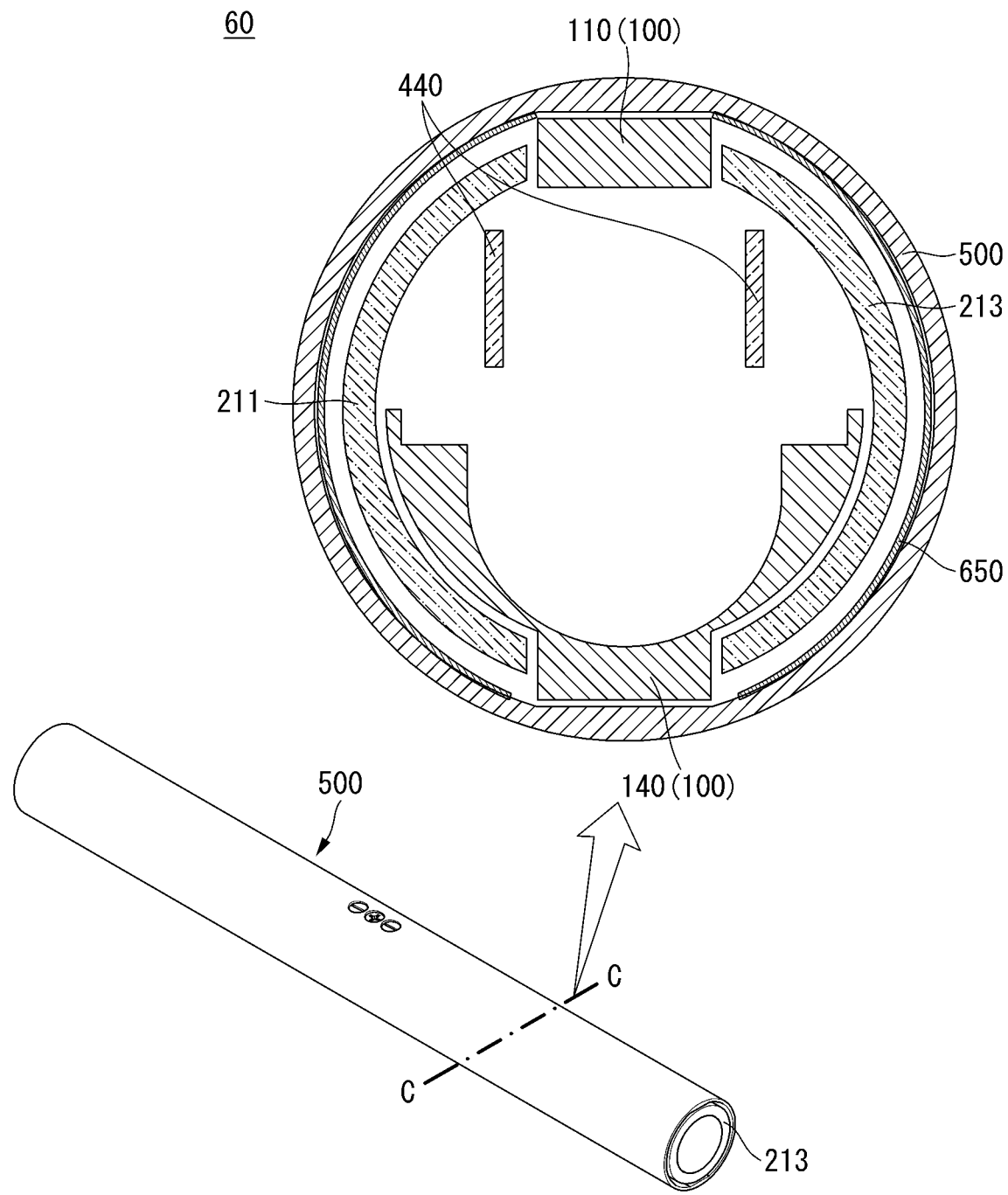

Referring to FIG. 22, the rod 60 may have a cylindrical shape. A cross section of the rod 60 cut along C-C may be observed. The first cradle 151 may extend from the second beam 140. The sectional shape of the first cradle 151 may be an arc. The second cradle 153 may extend from the second beam 140. The second cradle 153 may be symmetrical with the first cradle 151 with respect to the second beam 140.

A space may be formed between the first cradle 151 and the first beam 110. A portion of the belt 440 may be positioned between the first cradle 151 and the first beam 110. Another space may be formed between the second cradle 153 and the first beam 110. Another portion of the belt 440 may be positioned between the second cradle 153 and the first beam 110.

The first slider 211 may face the outer surface of the first cradle 151. The first slider 211 may be provided with driving force from the belt 440. The first slider 211 may move with respect to the first cradle 151. The second slider 213 may face the outer surface of the second cradle 153. The second slider 213 may be provided with driving force from the belt 440. The second slider 213 may move with respect to the second cradle 153. The first beam 110 and the second beam 140 may be positioned between the first slider 211 and the second slider 213.

The sensor pad 650 may be located on the outer surface of the sliders 211 and 213. The sensor pad 650 may be attached to the inner surface of the case 500. The case 500 may be located on the outer surface of the sensor pad 650.

Figure 23:
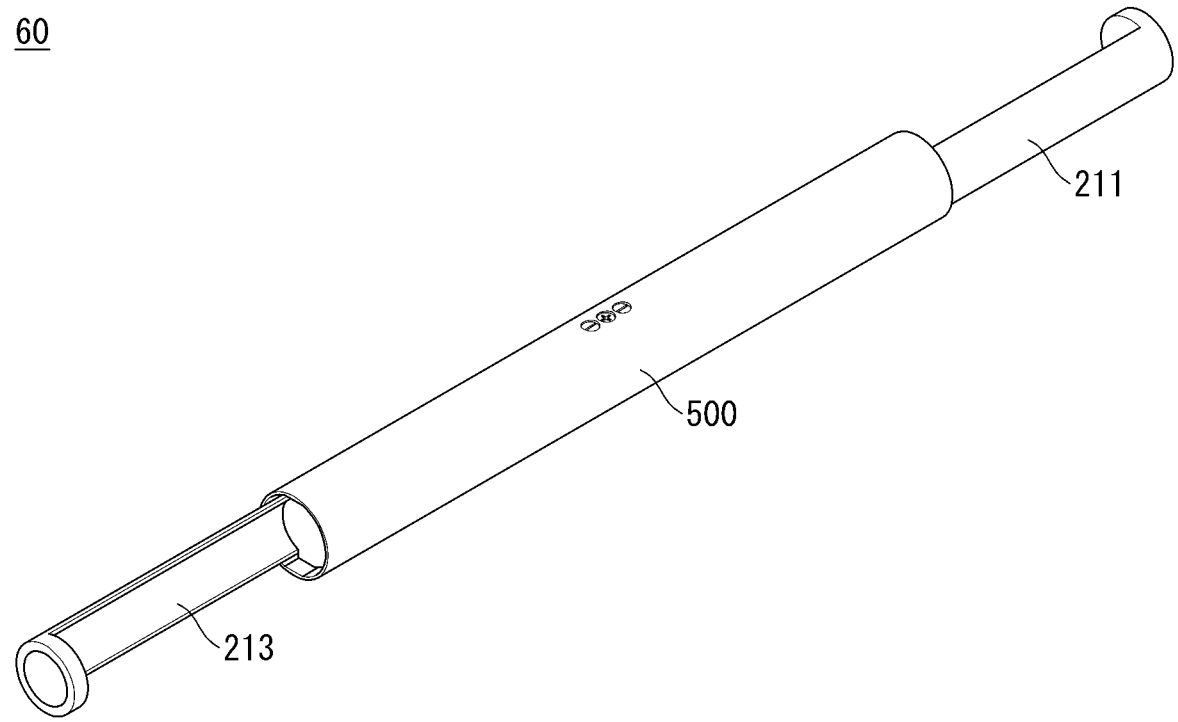

Referring to FIG. 23, the rod 60 may extend in the lengthwise direction. The first slider 211 and the second slider 213 may be pulled out of the case 500 or may be put into the case 500. The first slider 211 may move symmetrically with the second slider 213 with respect to the case 500.

Figure 24:
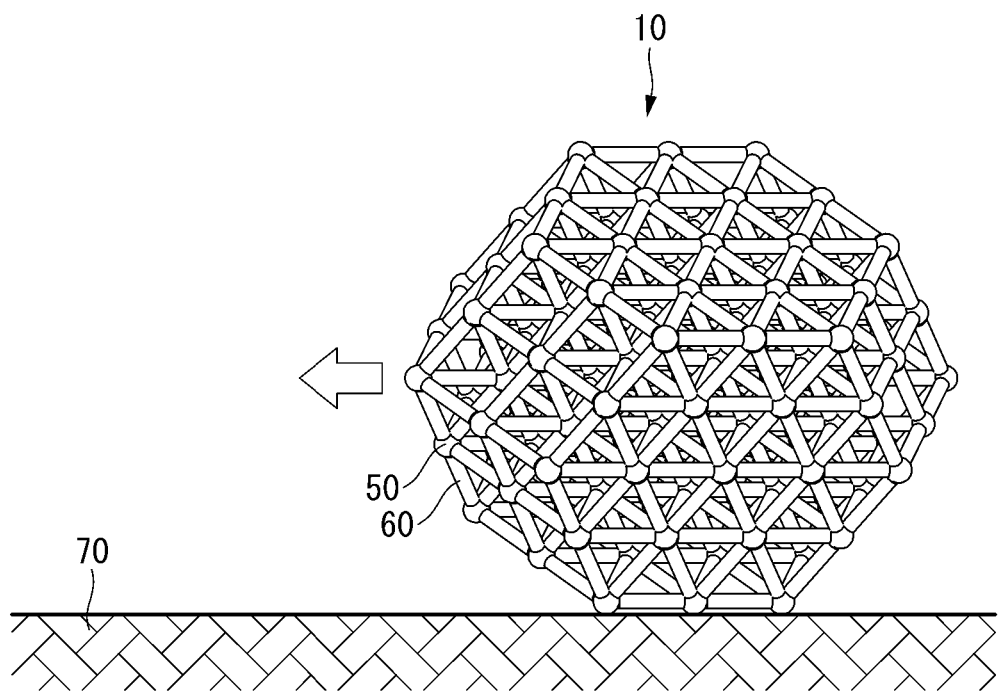
FIGS. 24 to 28 are views illustrating a working of a shape display device according to various embodiments of the present invention.

Referring to FIG. 24, the shape display device 10 according to an embodiment of the present invention may include a plurality of couplers 50 and a plurality of rods 60. The shape display device 10 may be placed on a horizontal plane 70.

There may be rods 60 forming the outer surface of the shape display device 10 among the plurality of rods 60. The rod 60 forming the outer surface of the shape display device 10 may be referred to as outer rods 60.

There may be rods 60 that form the interior of the shape display device 10 among the plurality of rods 60. The rods 60 forming the interior of the shape display device 10 may be referred to as inner rods 60.

There may be rods 60 connected to the outer rod 60 via one of couplers 50 among the inner rods 60. The rod 60 connected to the outer rod 60 via one of couplers 50 among the inner rods 60 may be referred to as connecting rods 60.

The outer rods 60 may form an outer appearance and/or an outline of the shape display device 10. The outer rods 60 may form a boundary between the shape display device 10 and the exterior. The outer rods 60 may have a higher rigidity than the inner rods 60. At least one of the outer rods 60 may have a display 670 (see FIG. 10). The image displayed on the display 670 (see FIG. 10) of the shape display device 10 may be two-dimensional or three-dimensional. Pixels of the image displayed on the display 670 (see FIG. 10) of the shape display device 10 may be the rods 60.

At least one of inner rods 60 may be responsible for communication between the shape display device 10 and an external terminal. The rod 60 that is responsible for communication between the shape display device 10 and the external terminal may be referred to as a hub rod 60.

The hub rod 60 may communicate with an external terminal. The hub rod 60 may communicate with another rod 60. The hub rod 60 may acquire information regarding status of another rod 60 and may provide the information to an external terminal. The hub rod 60 may command and control another rod 60.

A plurality of hub rods 60 may be provided. The plurality of hub rods 60 may form a network. The plurality of hub rods 60 may conduct parallel process.

The inner rods 60 may form a different layer from the outer rods 60. The inner rods 60 may have a display 670 (see FIG. 10). The image formed by the display 670 (see FIG. 10) provided with the inner rod 60 may form a layer different from the image formed by the display 670 (see FIG. 10) provided with the outer rods 60. The image formed by the display 670 (see FIG. 10) provided with the inner rods 60 may be controlled separately from the image formed by the display 670 (see FIG. 10) provided with the outer rods 60.

The rods 60 may be controlled individually. For example, the length variation of the rods 60 may be controlled individually. For example, there may be no change in the length of some rods 60, another some rods 60 may extend relatively small, and the other rods 60 may extend relatively large. For example, some extended rods 60 may be contracted.

As described above, if the lengths of the plurality of rods 60 are individually different, the overall shape of the shape display device 10 may change. When the overall shape of the shape display device 10 is changed, the point of application on the horizontal plane 70 may be changed. The point of application may be the point at which the shape display device 10 exerts a force against the horizontal surface 70 by an external force on the shape display device 10. The point of application may be multiple and may be formed on line segments. The external force applied to the shape display device 10 may be gravity. When the point of application of the shape display device 10 changes, the shape display device 10 may roll on the horizontal plane 70.

When the overall shape of the shape display device 10 is changed, the center of mass of the shape display device 10 may be changed. When the center of mass of the shape display device 10 is changed, the shape display device 10 may roll and move in the direction of the arrow, for example.

The plurality of rods 60 may communicate with each other. Among the plurality of rods 60, the hub rod 60 may be present. The hub rod 60 may communicate with another rod 60 and control the other rods 60. The hub rod 60 may check whether the other rods 60 are detected and function. The hub rod 60 may be disposed at a position surrounded by the other rods 60. A plurality of hub rods 60 may be provided.

Although not shown in the figures, the shape display device 10 may include a separate communication hub connected to the rod 60 or the coupler 50. The communication hub may communicate with the rod 60. The communication hub may communicate with an external terminal or the like. The rod 60 may be controlled by the external terminal or the like via the communication hub.

Figure 25:
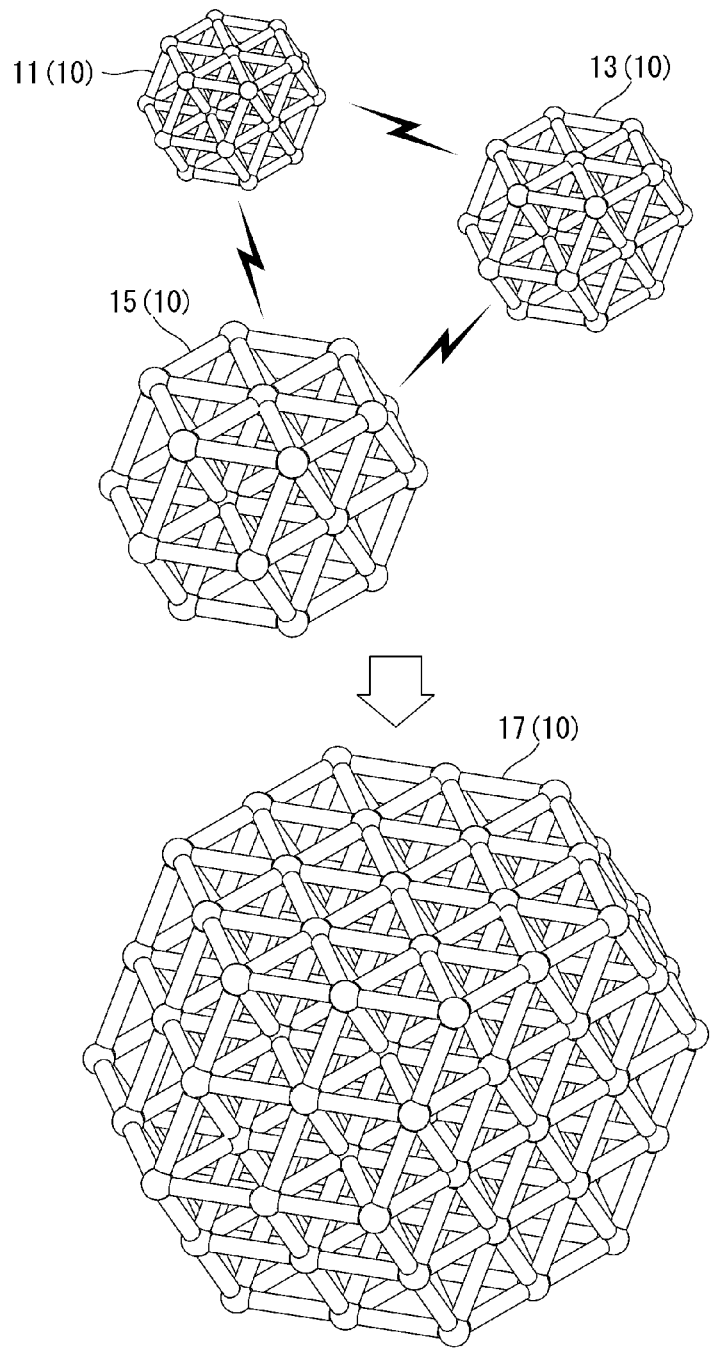

Referring to FIG. 25, a plurality of shape display devices 10 may be provided. For example, the shape display device 10 may include a first shape display device 11, a second shape display device 13, and a third shape display device 15.

The first shape display device 11 may communicate with the second shape display device 13 and the third shape display device 15. The first to third shape display devices 11, 13, and 15 may conduct a parallel computation.

The plurality of shape display devices 11, 13, and 15 may be combined. For example, the first to third shape display devices 11, 13, and 15 may be combined to form the combined shape display device 17.

The rods and couplers included in the combined shape display device 17 may be originated from the first to third shape display devices 11, 13, and 15. That is, the connection relationship between the rod and the coupler of the first to third shape display devices 11, 13 and 15 may be reconfigured.

For example, the number of rods connected to a coupler may increase. As a structure in which the number of rods connected to the coupler can be varied, a magnetic joint typed coupler 52 (see FIG. 3) may be considered.

Figure 26:
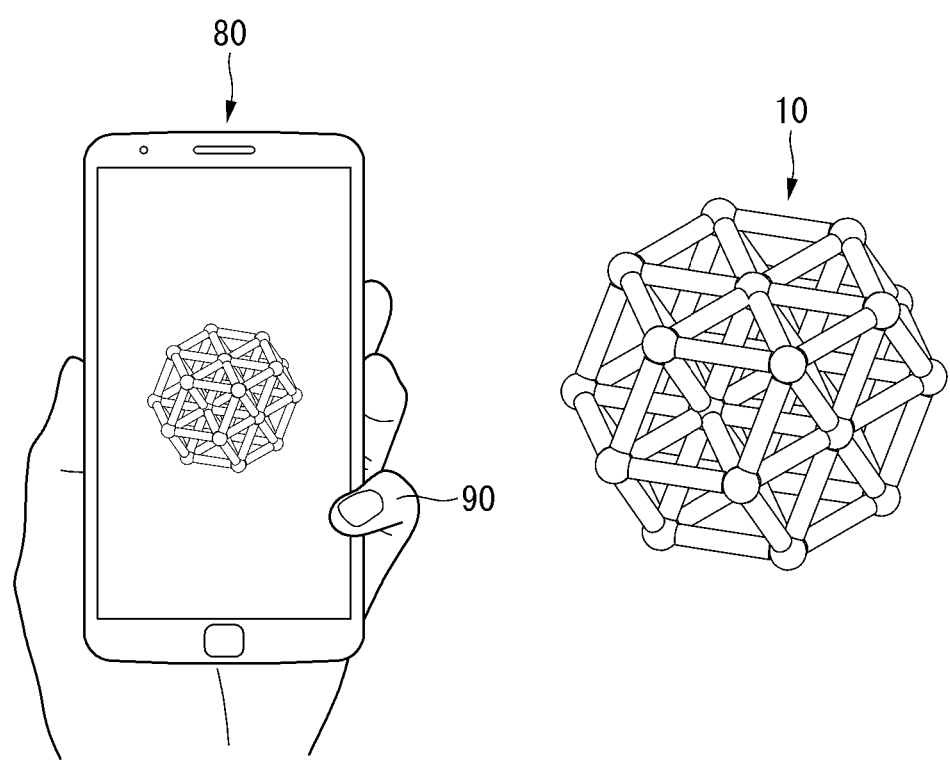

Referring to FIG. 26, for example, the user 90 may control the shape display device 10 using the mobile terminal 80. For example, the user 90 may control the shape display device 10 to be a shape of a sphere. For example, the mobile terminal 80 may provide the shape display device 10 with information about the shape of the sphere. An application for controlling the shape display device 10 may be installed in the mobile terminal 80.

Figure 27:
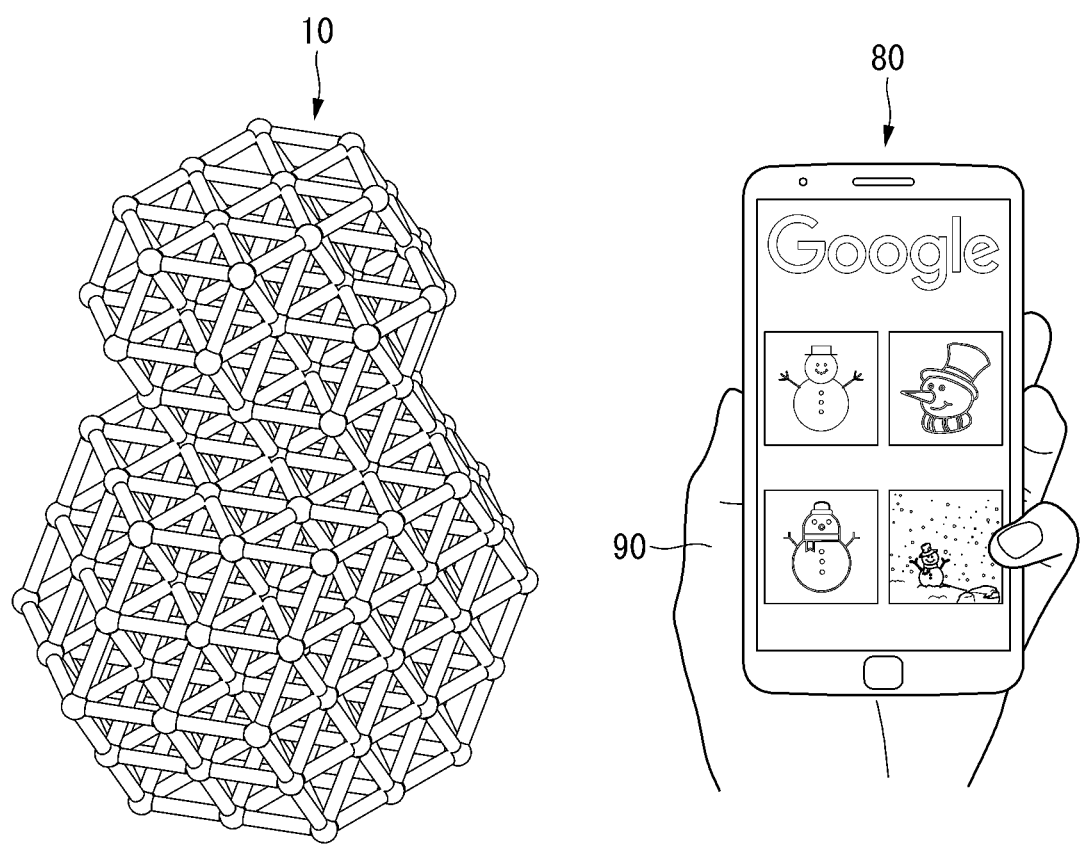

Referring to FIG. 27, the shape display device 10 may provide information regarding a shape of the shape display device 10 to the mobile terminal 80. The user 90 may search the information regarding the shape of the shape display device 10 by using the mobile terminal 80 provided with internet.

The shape of the shape display device 10 may be recognized when information regarding the position and orientation of each rod 60 is collected. The rod 60 may include an IMU (inertial measurement unit). The IMU may read the orientation of the rod 60. The IMU may be referred to as an inertial sensor.

The inertial sensor may obtain information about the position and orientation of the rod 60. The rod 60 may provide a mobile terminal 80 with information regarding the position and orientation of the individual rod 60 acquired using the inertial sensor. The mobile terminal 80 may acquire the shape information of the shape display device 10 by collecting the information about the position and orientation of the individual rod 60. Or the shape display device 10 may collect shape information of the shape display device 10 by collecting information about the position and orientation of each rod 60 and transmits the shape information of the shape display device 10 to the terminal 80.

Figure 28:
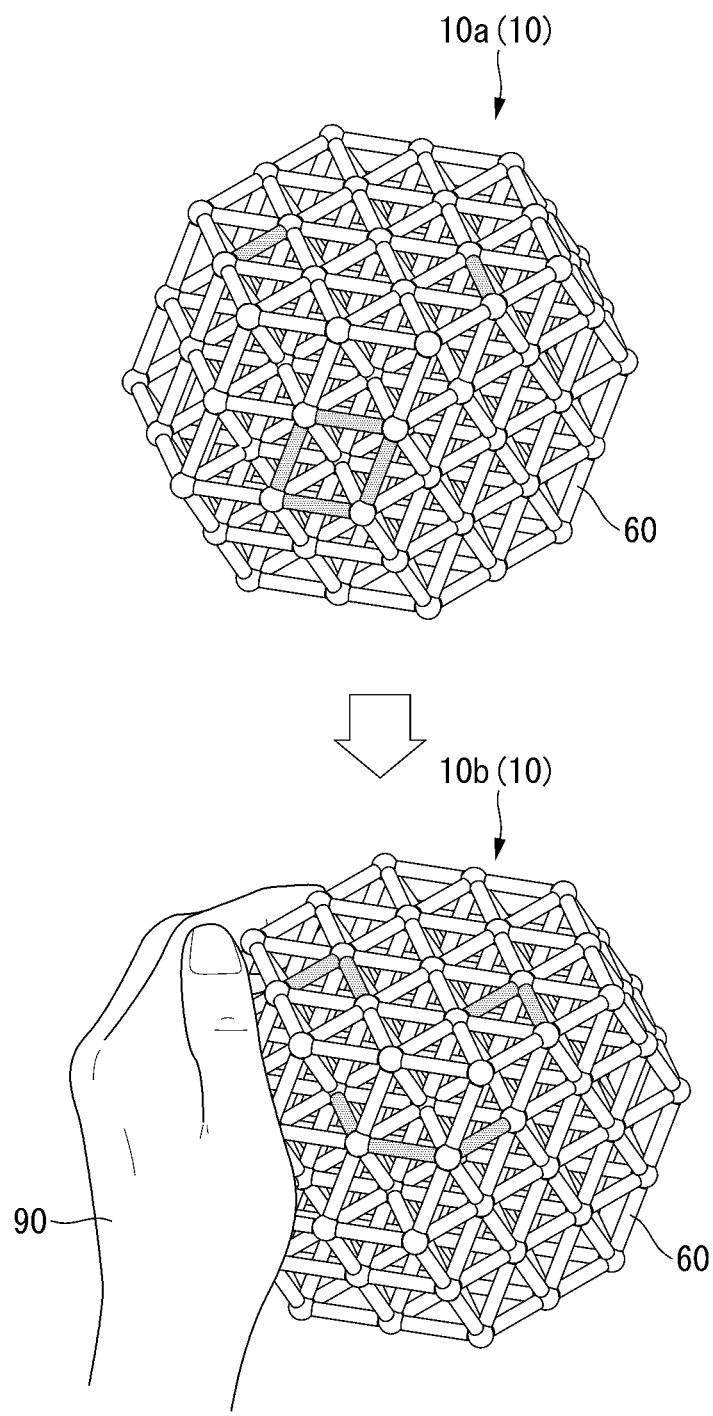

Referring to FIG. 28, the shape display device 10 may display using the individual rod 60. The shape display device 10 may look different depending on a configuration of image or light of the display 670 (see FIG. 10) provided in the individual rod 60, even though the overall shape of the shape display device 10 does not change. For example, the shape display device 10 may appear to have a different facial expression.

The shape display device 10 may be a shape display device 10a in a first state. The shape display device 10a in the first state may have a smileless expression.

The shape display device 10 may recognize the touch or access of the user 90. When the shape display device 10 recognizes the touch or approach of the user 90, the shape display device 10 may be the shape display device 10b in the second state. The shape display device 10b in the second state may have a smiling face.

In this way, the shape display device 10 may sense the approach or touch of the user 90 and provide the user 90 with different emotions based on the situation.

Although not shown in the drawings, the shape display device 10 can express a facial expression. When the shape display device 10 changes shape, the expression appeared on the shape display device 10 may be changed.

The shape change of the shape display device 10 may be enabled by the control of the individual rod 60. The angle between the adjacent rods 60 may be controlled by adjusting the length of the rod 60. The rod 60 may be understood as an element connecting nodes. Hereinafter, 'link' may mean a rod 60.

When two lines in two-dimensional space meet at one point, the configuration of the two lines is either convex, concave, or collinear. Similarly, in three-dimensional space, when three lines meet at one point, the configuration of the three lines is either convex, concave, or coplanar. The straight line divides the plane into two, and the plane divides the space into two. The convex and concave are used in order to distinguish whether the particular node is placed in which space between the two divided spaces.

Translational inertia and moment of inertia may be considered. The movement of a node as an object with mass may be analysed by using the translational inertia. Through the movement of both ends, the movement of the link may be analysed by using the moment of inertia. In order to use the above two inertias, the controllability of the desired path must be assumed, and this controllability can be ensured by equally expanding or reducing the links.

In the second dimension, two independent constraints are required to define a point. When a new constraint is applied to this, this point may have residual constraint. Likewise, in three dimensions, beyond the three constraints, the point may have extra constraints. In this case, the system is said to have residuality.

When a physical quantity is detected and controlled, an error or the like may occur, and this control may have uncertainty. Accordingly, the difficulty of the control may be increased. If the system has a residuality, the ease of control may be increased. For example, in the case of an icosahedron, all the nodes are connected to five links, which leads to the ease of control at all nodes due to the residuality.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A shape display device, comprising:
a plurality of couplers; and
a plurality of rods pivotally connected to the couplers, a rod of the plurality of rods, having a varying length in a lengthwise direction, and the rod including:
a main frame;
a circuit board accommodated in the main frame;
a first slider movably mounted on the main frame, the first slider connected to a first coupler among the plurality of couplers;
a second slider movably mounted on the main frame, the second slider connected to a second coupler among the plurality of couplers; and
a driver installed in the main frame, the driver providing the first and second sliders with a driving force, the driver connected to the circuit board electrically,
wherein the main frame includes:
a first beam extended in the lengthwise direction;
a second beam extended in the lengthwise direction, the second beam facing the first beam, and the second beam being spaced apart from the first beam;

a cradle extended from the second beam, the cradle forming an accommodation space therein;
a first end portion located at an end of the main frame, the first end portion connecting the first beam and the second beam; and
a second end portion located at another end of the main frame, the second end portion connecting the first beam and the second beam,
wherein the cradle is positioned between the first end portion and the second end portion, and the cradle is spaced apart from the first beam, and
wherein the cradle includes:
a first cradle facing the first slider, the first cradle being spaced apart from the first beam; and
a second cradle facing the second slider, the second cradle being spaced apart from the second beam.

2. The shape display device of claim 1, wherein the first slider is positioned opposite to the second slider with respect to the main frame.

3. The shape display device of claim 1,
wherein the rod includes a case,
wherein the case comprises the first slider, the second slider, and the main frame, and
wherein the first and second sliders are capable of being drawn out of the case or being put into the case.

4. The shape display device of claim 3, wherein the rod includes a sensor pad positioned between the first and second sliders and the case, and
wherein the sensor pad senses a touch or an access of external object.

5. The shape display device of claim 4, wherein the sensor pad includes:
a first pad facing the first slider; and
a second pad facing the second slider.

6. The shape display device of claim 1,
wherein the rod includes a power transmission portion installed in the main frame,
wherein the driver includes a rotation motor installed in the main frame, the rotation motor being adjacent to the first end portion, and
wherein the power transmission portion includes:
a first connection gear rotatably installed in the main frame, the first connection gear being provided with a rotational force from the rotation motor;
a second connection gear rotatably installed in the main frame, the second connection gear being positioned adjacent to the second end portion; and
a belt having a ring shape, the belt connecting the first connection gear and the second connection gear.

7. The shape display device of claim 6, wherein a portion of the belt is located between the cradle and the first beam.

8. The shape display device of claim 6,
wherein the rod includes a power connection portion connected to the slider,
wherein the power connection portion is located between the first beam and the cradle, and
wherein the power connection portion is coupled with the belt mechanically.

9. The shape display device of claim 8, wherein the power connection portion includes:
a base formed adjacent to an edge of the slider;
a first wall extended toward another edge of the slider from the base; and
a second wall extended toward the other edge of the slider from the base, the second wall being spaced apart from the first wall,
wherein the belt is fitted into between the first wall and the second wall.

10. The shape display device of claim 9,
wherein the belt includes:
a belt body having a ring shape; and
a plurality of belt protrusions projecting from the belt body, and
wherein the power connection portion includes:
a protrusion projecting toward the first wall from the second wall, the protrusion engaging with at least one of the belt protrusions.

11. The shape display device of claim 6, wherein the power transmission portion includes:
a first bevel gear connected to the rotation motor; and
a second bevel gear connected to the first connection gear coaxially, the second bevel gear engaging with the first bevel gear.

12. The shape display device of claim 6,
wherein the rod includes a case accommodating the first and second sliders and the main frame,
wherein the first slider is accommodated in a space formed by the case, the second beam, the first cradle, and the first beam, and
wherein the second slider is accommodated in a space formed by the case, the second beam, the second cradle, and the first beam.

13. The shape display device of claim 6,
wherein the first slider includes:
a first slider body facing the first cradle; and
a first slider cap extended from the first slider body, the first slider cap being adjacent to the first end portion, and
wherein the second slider includes:
a second slider body facing the second cradle; and
a second slider cap extended from the second slider body, the second slider cap being adjacent to the second end portion.

14. The shape display device of claim 13,
wherein the main frame is located between the first slider cap and the second slider cap, and
wherein the first and second slider caps include a node link portion coupled with a joint.

15. The shape display device of claim 14,
wherein the joint includes a metal, and
wherein the node link portion includes a magnet coupled with the joint magnetically.

16. The shape display device of claim 1,
wherein the rod includes:
a display installed in the main frame, the display radiating a light or forming an image;
a camera installed in the main frame; and
a case accommodating the main frame and the first and second sliders, and
wherein the case includes a window through which light passes.

17. A shape display device, comprising:
a plurality of couplers; and
a plurality of rods pivotally connected to the couplers, wherein a rod, of the plurality of rods has a varying length in a lengthwise direction and includes:
a main frame;
a circuit board accommodated in the main frame;
a first slider movably mounted on the main frame, the first slider connected to a first coupler among the plurality of couplers;

a second slider movably mounted on the main frame, the second slider connected to a second coupler among the plurality of couplers;
a driver installed in the main frame, the driver providing the first and second sliders with a driving force, the driver connected to the circuit board electrically;
a display installed in the main frame, the display radiating a light or forming an image;
a camera installed in the main frame; and
a case accommodating the main frame and the first and second sliders, and
wherein the case includes a window through which light passes.

* * * * *